United States Patent
Yoshimoto et al.

(10) Patent No.: US 9,485,172 B2
(45) Date of Patent: Nov. 1, 2016

(54) DATA TRANSMITTING DEVICE, DATA TRANSMITTING METHOD AND NON-TRANSITORY COMPUTER-READABLE STORAGE MEDIUM

(71) Applicant: FUJITSU LIMITED, Kawasaki, Kanagawa (JP)

(72) Inventors: Masahiro Yoshimoto, Kawasaki (JP); Nobuhiro Rikitake, Machida (JP); Toshifumi Yokoyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 170 days.

(21) Appl. No.: 14/259,516

(22) Filed: Apr. 23, 2014

(65) Prior Publication Data
US 2014/0347975 A1    Nov. 27, 2014

(30) Foreign Application Priority Data
May 22, 2013    (JP) .................................. 2013-108379

(51) Int. Cl.
*H04L 12/703* (2013.01)
*H04L 12/707* (2013.01)
*H04L 12/24* (2006.01)

(52) U.S. Cl.
CPC ........... *H04L 45/28* (2013.01); *H04L 41/0659* (2013.01); *H04L 45/22* (2013.01)

(58) Field of Classification Search
None
See application file for complete search history.

(56) References Cited

U.S. PATENT DOCUMENTS

| | | | | |
|---|---|---|---|---|
| 2002/0004843 A1* | 1/2002 | Andersson | ............... | H04L 45/00 709/238 |
| 2003/0023893 A1* | 1/2003 | Lee | .......................... | H04L 45/00 714/4.5 |
| 2010/0315943 A1* | 12/2010 | Chao | .................... | H04L 41/0668 370/221 |
| 2011/0038253 A1* | 2/2011 | Yabusaki | ................. | H04L 45/02 370/217 |
| 2011/0058488 A1* | 3/2011 | Watari | ..................... | H04L 12/56 370/245 |
| 2011/0273980 A1* | 11/2011 | Ashwood Smith | ..... | H04L 45/00 370/225 |

OTHER PUBLICATIONS

R. Perlman, et al., "Routing Bridges (RBridges): Base Protocol Specification", IETF RFC 6325, pp. 1-99, Jul. 2011.
D. Eastlake, et al., "Transparent Interconnection of Lots of Links (TRILL) Use of IS-IS", IETF RFC 6326, pp. 1-25, Jul. 2011.
D. Eastlake 3rd, et al., "Routing Bridges (RBridges): Adjacency", IETF RFC 6327, pp. 1-26, Jul. 2011.
R. Perlman, et al., "Routing Bridges (RBridges): Appointed Forwarders", IETF RFC 6439, pp. 1-15, Nov. 2011.

* cited by examiner

*Primary Examiner* — Gary Mui
(74) *Attorney, Agent, or Firm* — Staas & Halsey LLP

(57) ABSTRACT

A data transmitting device coupling to a plurality of nodes in a network includes a plurality of communication paths, the data transmitting device includes a memory and a processor coupled to the memory configured to set a routing table based on a command that designates a first communication path included in the plurality of communication paths, to detect a link failure occurred in the network, and when the link failure has occurred at a first location between the data transmitting device and a first node adjacent to the data transmitting device on the first communication path, to modify the routing table so that data are to be transmitted to a second node on a second communication path different from the first communication path, and when the link failure has occurred at a second location that differs from the first location in the network, to maintain the routing table.

15 Claims, 30 Drawing Sheets

FIG. 2

| LINK RATE | COST |
|---|---|
| 10(Mbps) | 5 |
| 100(Mbps) | 4 |
| 1(Gbps) | 3 |
| 10(Gbps) | 2 |
| 40(Gbps) | 1 |

FIG. 4

| SIGN | COMMUNICATION PATH<br>(NUMBERS IN [ ] INDICATE PORT NUMBERS) | VLAN ID<br>(n=0,1,2,...,511) |
|---|---|---|
| P10 | [3]RB#1[1]->[1]RB#2[2]->[1]RB#4[2]->[1]RB#6[3] | 8n, 8n+2 |
| P11 | [3]RB#1[1]->[1]RB#2[3]->[3]RB#5[2]->[2]RB#6[3] | 8n+1, 8n+3 |
| P21 | [3]RB#1[2]->[1]RB#3[3]->[3]RB#4[2]->[1]RB#6[3] | 8n+5, 8n+7 |
| P20 | [3]RB#1[2]->[1]RB#3[2]->[1]RB#5[2]->[2]RB#6[3] | 8n+4, 8n+6 |

FIG. 6

| SIGN | COMMUNICATION PATH (NUMBERS IN [ ] INDICATE PORT NUMBERS) | BEFORE MODIFICATION | | AFTER MODIFICATION | |
|---|---|---|---|---|---|
| | | VLAN ID (BANDWIDTH (MBPS) IN [ ]) | TOTAL BANDWIDTH (MBPS) | VLAN ID (BANDWIDTH (MBPS) IN [ ]) | TOTAL BANDWIDTH (MBPS) |
| P10 | [3]RB#1[1]->[1]RB#2[2]->[1]RB#4[2]->[1]RB#6[3] | 8[500],10[100] | 600 | 8[500] | 500 |
| P11 | [3]RB#1[1]->[1]RB#2[3]->[3]RB#5[2]->[2]RB#6[3] | 9[200],11[200] | 400 | 9[200],11[200] | 400 |
| P21 | [3]RB1#[2]->[1]RB#3[3]->[3]RB#4[2]->[1]RB#6[3] | 13[100],15[200] | 300 | 10[100], 13[100],15[200] | 400 |
| P20 | [3]RB#1[2]->[1]RB#3[2]->[1]RB#5[2]->[2]RB#6[3] | 12[200],14[200] | 400 | 12[200],14[200] | 400 |

FIG. 8

| SIGN | COMMUNICATION PATH (NUMBERS IN [ ] INDICATE PORT NUMBERS) | BEFORE MODIFICATION | AFTER MODIFICATION | AFTER LINK BREAK |
|---|---|---|---|---|
| | | VLAN ID | VLAN ID | VLAN ID |
| P10 | [3]RB1[1]->[1]RB2[2]->[1]RB4[2]->[1]RB6[3] | 8,10 | 8,9,10,11 | 8,10 |
| P11 | [3]RB1[1]->[1]RB2[3]->[3]RB5[2]->[2]RB6[3] | 9,11 | - | 9,11 |
| P21 | [3]RB1[2]->[1]RB3[3]->[3]RB4[2]->[1]RB6[3] | 13,15 | 12,13,14,15 | 12,13,14,15 |
| P20 | [3]RB1[2]->[1]RB3[2]->[1]RB5[2]->[2]RB6[3] | 12,14 | - | - |

FIG. 11

| NODE | PRIORITY | VLAN ID | NEXT NODE ID | ENABLED/DISABLED |
|---|---|---|---|---|
| RB#1 | HIGH | 10 | RB#3 | ENABLED |
| | LOW | 10 | RB#2 | - |
| RB#2 | HIGH | - | - | - |
| | LOW | 10 | RB#4 | - |
| RB#3 | HIGH | 10 | RB#4 | ENABLED |
| | LOW | 10 | RB#5 | - |
| RB#4 | HIGH | - | - | - |
| | LOW | 10 | RB#6 | - |
| RB#5 | HIGH | - | - | - |
| | LOW | 10 | RB#6 | - |

FIG. 13

| NODE | PRIORITY | VLAN ID | NEXT NODE ID | ENABLED/DISABLED |
|---|---|---|---|---|
| RB#1 | HIGH | 10 | RB#3 | DISABLED |
| | LOW | 10 | RB#2 | - |
| RB#2 | HIGH | - | - | - |
| | LOW | 10 | RB#4 | - |
| RB#3 | HIGH | 10 | RB#4 | ENABLED |
| | LOW | 10 | RB#5 | - |
| RB#4 | HIGH | - | - | - |
| | LOW | 10 | RB#6 | - |
| RB#5 | HIGH | - | - | - |
| | LOW | 10 | RB#6 | - |

FIG. 14

| NODE | PRIORITY | VLAN ID | NEXT NODE ID | ENABLED/DISABLED |
|---|---|---|---|---|
| RB#1 | HIGH | - | - | - |
|  | LOW | 10 | RB#2 | - |
| RB#2 | HIGH | - | - | - |
|  | LOW | 10 | RB#4 | - |
| RB#3 | HIGH | 10 | RB#4 | ENABLED |
|  | LOW | 10 | RB#5 | - |
| RB#4 | HIGH | - | - | - |
|  | LOW | 10 | RB#6 | - |
| RB#5 | HIGH | - | - | - |
|  | LOW | 10 | RB#6 | - |

FIG. 16

| NODE | PRIORITY | VLAN ID | NEXT NODE ID | ENABLED/DISABLED |
|---|---|---|---|---|
| RB#1 | HIGH | 10 | RB#3 | ENABLED |
| | LOW | 10 | RB#2 | - |
| RB#2 | HIGH | - | - | - |
| | LOW | 10 | RB#4 | - |
| RB#3 | HIGH | 10 | RB#4 | DISABLED |
| | LOW | 10 | RB#5 | - |
| RB#4 | HIGH | - | - | - |
| | LOW | 10 | RB#6 | - |
| RB#5 | HIGH | - | - | - |
| | LOW | 10 | RB#6 | - |

FIG. 17

| NODE | PRIORITY | VLAN ID | NEXT NODE ID | ENABLED /DISABLED |
|---|---|---|---|---|
| RB#1 | HIGH | 10 | RB#3 | ENABLED |
| | LOW | 10 | RB#2 | - |
| RB#2 | HIGH | - | - | - |
| | LOW | 10 | RB#4 | - |
| RB#3 | HIGH | - | - | - |
| | LOW | 10 | RB#5 | - |
| RB#4 | HIGH | - | - | - |
| | LOW | 10 | RB#6 | - |
| RB#5 | HIGH | - | - | - |
| | LOW | 10 | RB#6 | - |

FIG. 23A

| VLAN ID(dec.) | VLAN ID(bin.) | | | | | | | | | | | | | | | PATTERN |
|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 1 | 001 |
| 2 | 0 | 0 | 0 | 0 | 0 | 0 | 0 | 0 | 0 | 0 | 0 | 0 | 0 | 1 | 0 | 010 |
| 3 | 0 | 0 | 0 | 0 | 0 | 0 | 0 | 0 | 0 | 0 | 0 | 0 | 0 | 1 | 1 | 011 |
| 4 | 0 | 0 | 0 | 0 | 0 | 0 | 0 | 0 | 0 | 0 | 0 | 0 | 1 | 0 | 0 | 100 |
| 5 | 0 | 0 | 0 | 0 | 0 | 0 | 0 | 0 | 0 | 0 | 0 | 0 | 1 | 0 | 1 | 101 |
| 6 | 0 | 0 | 0 | 0 | 0 | 0 | 0 | 0 | 0 | 0 | 0 | 0 | 1 | 1 | 0 | 110 |
| 7 | 0 | 0 | 0 | 0 | 0 | 0 | 0 | 0 | 0 | 0 | 0 | 0 | 1 | 1 | 1 | 111 |
| 8 | 0 | 0 | 0 | 0 | 0 | 0 | 0 | 0 | 0 | 0 | 0 | 1 | 0 | 0 | 0 | 000 |
| 9 | 0 | 0 | 0 | 0 | 0 | 0 | 0 | 0 | 0 | 0 | 0 | 1 | 0 | 0 | 1 | 001 |
| ... | | | | | | | ... | | | | | | | | | ... |
| 4093 | 1 | 1 | 1 | 1 | 1 | 1 | 1 | 1 | 1 | 1 | 1 | 1 | 1 | 0 | 1 | 101 |
| 4094 | 1 | 1 | 1 | 1 | 1 | 1 | 1 | 1 | 1 | 1 | 1 | 1 | 1 | 1 | 0 | 110 |

FIG. 23B

| PATTERN | ECMP NUMBER | | | | | | | |
|---|---|---|---|---|---|---|---|---|
| | 8 | 7 | 6 | 5 | 4 | 3 | 2 | 1 |
| 000 | 1 | 1 | 1 | 1 | 1 | 1 | 1 | 1 |
| 001 | 2 | 1 | 1 | 1 | 1 | 1 | 1 | 1 |
| 010 | 3 | 2 | 2 | 2 | 2 | 1 | 1 | 1 |
| 011 | 4 | 3 | 2 | 2 | 2 | 2 | 1 | 1 |
| 100 | 5 | 4 | 3 | 3 | 3 | 2 | 2 | 1 |
| 101 | 6 | 5 | 4 | 3 | 3 | 2 | 2 | 1 |
| 110 | 7 | 6 | 5 | 4 | 4 | 3 | 2 | 1 |
| 111 | 8 | 7 | 6 | 5 | 4 | 3 | 2 | 1 |

FIG. 23C

| PATTERN | OUTPUT DESTINATION NUMBER | NEXT NODE ID | VLAN ID |
|---|---|---|---|
| 000 | 1 | RB#2 | 8 |
| 001 | 1 | RB#2 | 9 |
| 010 | 1 | RB#2 | 10 |
| 011 | 1 | RB#2 | 11 |
| 100 | 2 | RB#3 | 12 |
| 101 | 2 | RB#3 | 13 |
| 110 | 2 | RB#3 | 14 |
| 111 | 2 | RB#3 | 15 |

FIG. 24A

| VLAN ID(dec.) | VLAN ID(bin.) | | | | | | | | | | | | | | | PATTERN |
|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 1 | 001 |
| 2 | 0 | 0 | 0 | 0 | 0 | 0 | 0 | 0 | 0 | 0 | 0 | 0 | 0 | 1 | 0 | 010 |
| 3 | 0 | 0 | 0 | 0 | 0 | 0 | 0 | 0 | 0 | 0 | 0 | 0 | 0 | 1 | 1 | 011 |
| 4 | 0 | 0 | 0 | 0 | 0 | 0 | 0 | 0 | 0 | 0 | 0 | 0 | 1 | 0 | 0 | 100 |
| 5 | 0 | 0 | 0 | 0 | 0 | 0 | 0 | 0 | 0 | 0 | 0 | 0 | 1 | 0 | 1 | 101 |
| 6 | 0 | 0 | 0 | 0 | 0 | 0 | 0 | 0 | 0 | 0 | 0 | 0 | 1 | 1 | 0 | 110 |
| 7 | 0 | 0 | 0 | 0 | 0 | 0 | 0 | 0 | 0 | 0 | 0 | 0 | 1 | 1 | 1 | 111 |
| 8 | 0 | 0 | 0 | 0 | 0 | 0 | 0 | 0 | 0 | 0 | 0 | 1 | 0 | 0 | 0 | 000 |
| 9 | 0 | 0 | 0 | 0 | 0 | 0 | 0 | 0 | 0 | 0 | 0 | 1 | 0 | 0 | 1 | 001 |
| ... | ... | | | | | | | | | | | | | | | ... |
| 4093 | 1 | 1 | 1 | 1 | 1 | 1 | 1 | 1 | 1 | 1 | 1 | 1 | 1 | 0 | 1 | 101 |
| 4094 | 1 | 1 | 1 | 1 | 1 | 1 | 1 | 1 | 1 | 1 | 1 | 1 | 1 | 1 | 0 | 110 |

FIG. 24B

| PATTERN | ECMP NUMBER | | | | | | | |
|---|---|---|---|---|---|---|---|---|
| | 8 | 7 | 6 | 5 | 4 | 3 | 2 | 1 |
| 000 | 1 | 1 | 1 | 1 | 1 | 1 | 1 | 1 |
| 001 | 2 | 2 | 2 | 2 | 2 | 2 | 2 | 1 |
| 010 | 3 | 3 | 3 | 3 | 3 | 3 | 1 | 1 |
| 011 | 4 | 4 | 4 | 4 | 4 | 1 | 2 | 1 |
| 100 | 5 | 5 | 5 | 5 | 1 | 2 | 1 | 1 |
| 101 | 6 | 6 | 6 | 1 | 2 | 3 | 2 | 1 |
| 110 | 7 | 7 | 1 | 2 | 3 | 1 | 1 | 1 |
| 111 | 8 | 1 | 2 | 3 | 4 | 2 | 2 | 1 |

FIG. 24C

| PATTERN | OUTPUT DESTINATION NUMBER | NEXT NODE ID | VLAN ID |
|---|---|---|---|
| 000 | 1 | RB#4 | 8 |
| 001 | 2 | RB#5 | 9 |
| 010 | 1 | RB#4 | 10 |
| 011 | 2 | RB#5 | 11 |
| 100 | 1 | RB#4 | 12 |
| 101 | 2 | RB#5 | 13 |
| 110 | 1 | RB#4 | 14 |
| 111 | 2 | RB#5 | 15 |

FIG. 26

| NODE TYPE | PRIORITY | VLAN ID | NEXT NODE ID | ENABLED/DISABLED |
|---|---|---|---|---|
| INGRESS RB | HIGH | - | - | - |
| | LOW | 8 | RB#2 | - |
| | | 9 | RB#2 | - |
| | | 10 | RB#2 | - |
| | | 11 | RB#2 | - |
| | | 12 | RB#3 | - |
| | | 13 | RB#3 | - |
| | | 14 | RB#3 | - |
| | | 15 | RB#3 | - |
| TRANSIT RB | HIGH | - | - | - |
| | LOW | 8 | RB#2 | - |
| | | 9 | RB#3 | - |
| | | 10 | RB#2 | - |
| | | 11 | RB#3 | - |
| | | 12 | RB#2 | - |
| | | 13 | RB#3 | - |
| | | 14 | RB#2 | - |
| | | 15 | RB#3 | - |

FIG. 28

| NODE TYPE | PRIORITY | VLAN ID | NEXT NODE ID | ENABLED/DISABLED |
|---|---|---|---|---|
| INGRESS RB | HIGH | 9 | RB#3 | ENABLED |
| | LOW | 8 | RB#2 | - |
| | | 9 | RB#2 | - |
| | | 10 | RB#2 | - |
| | | 11 | RB#2 | - |
| | | 12 | RB#3 | - |
| | | 13 | RB#3 | - |
| | | 14 | RB#3 | - |
| | | 15 | RB#3 | - |
| TRANSIT RB | HIGH | - | - | - |
| | LOW | 8 | RB#2 | - |
| | | 9 | RB#3 | - |
| | | 10 | RB#2 | - |
| | | 11 | RB#3 | - |
| | | 12 | RB#2 | - |
| | | 13 | RB#3 | - |
| | | 14 | RB#2 | - |
| | | 15 | RB#3 | - |

FIG. 30

| NODE TYPE | PRIORITY | VLAN ID | NEXT NODE ID | ENABLED/ DISABLED |
|---|---|---|---|---|
| INGRESS RB | - | - | - | - |
| | LOW | 8 | RB#2 | - |
| | | 9 | RB#2 | - |
| | | 10 | RB#2 | - |
| | | 11 | RB#2 | - |
| | | 12 | RB#2 | - |
| | | 13 | RB#2 | - |
| | | 14 | RB#2 | - |
| | | 15 | RB#2 | - |
| TRANSIT RB | HIGH | - | - | - |
| | LOW | 8 | RB#2 | - |
| | | 9 | RB#2 | - |
| | | 10 | RB#2 | - |
| | | 11 | RB#2 | - |
| | | 12 | RB#2 | - |
| | | 13 | RB#2 | - |
| | | 14 | RB#2 | - |
| | | 15 | RB#2 | - |

DATA TRANSMITTING DEVICE, DATA TRANSMITTING METHOD AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2013-108379, filed on May 22, 2013, the entire contents of which are incorporated herein by reference.

FIELD

The embodiment discussed herein is related to a data transmitting device, a data transmitting method and non-transitory computer-readable storage medium.

BACKGROUND

Along with the increase in communication demand, more effective communication path control functionality is demanded of Layer 2 switches that forward packets on a network. For example, the spanning tree protocol is established as a communication path control technique. However, in order to keep a communication path from becoming a loop, the spanning tree protocol produces blocking ports by limiting the communication path candidates to a tree. For this reason, there exists a problem in that effective bandwidth utilization becomes difficult, for example.

Meanwhile, the Transparent Interconnection of Lots of Links (TRILL) technology stipulated by the Internet Engineering Task Force (IETF) is gaining prevalence as a communication path control technique. TRILL technology is characterized by a Shortest Path First (SPF) algorithm that determines a communication path that minimizes the total of costs that signify the communication rate of each link, and an Equal Cost Multi Path (ECMP) algorithm that allows traffic distribution when multiple such communication paths exist. Relevant literature of the related art includes D. Eastlake: "Transparent Interconnection of Lots of Links (TRILL) Use of IS-IS", IETF RFC 6326, July 2011, R. Perlman: "Routing Bridges (RBridges): Base Protocol Specification", IETF RFC 6325, July 2011, D. Eastlake 3rd, "Routing Bridges (RBridges): Adjacency", IETF RFC 6327, July 2011, and R. Perlman: "Routing Bridges (RBridges): Appointed Forwarders", IETF RFC 6439, November 2011.

SUMMARY

According to an aspect of the invention, a data transmitting device coupling to a plurality of nodes in a network includes a plurality of communication paths, the data transmitting device includes a memory and a processor coupled to the memory. The processor is configured to set a routing table in the memory based on a command that designates a first communication path included in the plurality of communication paths, to detect a link failure occurred in the network, and when the link failure has occurred at a first location between the data transmitting device and a first node adjacent to the data transmitting device on the first communication path, to modify the routing table so that data are to be transmitted to a second node on a second communication path different from the first communication path, and when the link failure has occurred at a second location that differs from the first location in the network, to maintain the routing table, and transmit the data from the data transmitting device in accordance with the routing table.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a table illustrating an example of link costs;

FIG. 4 is a table illustrating assignment of VLAN IDs to communication paths;

FIG. 6 is a table illustrating bandwidth totals for individual communication paths before and after modification;

FIG. 8 is a table illustrating assignment of VLAN IDs to communication paths before and after modification and after link break as a comparative example;

FIG. 11 is a table illustrating routing table settings for each node in the state of FIG. 10;

FIG. 13 is a table illustrating an example (1) of routing table settings for each node in the state of FIG. 12;

FIG. 14 is a table illustrating an example (2) of routing table settings for each node in the state of FIG. 12;

FIG. 16 is a table illustrating an example (1) of routing table settings for each node in the state of FIG. 15;

FIG. 17 is a table illustrating an example (2) of routing table settings for each node in the state of FIG. 15;

FIGS. 23A, 23B and 23C are diagrams illustrating a forwarding destination node determination method for an ingress routing bridge (RB);

FIGS. 24A, 24B and 24C are diagrams illustrating a forwarding destination node determination method for a transit RB;

FIG. 26 is a table illustrating routing table settings for the node RB#1 in the state of FIG. 25;

FIG. 28 is a table illustrating routing table settings for the node RB#1 in the state of FIG. 27;

FIG. 30 is a table illustrating routing table settings for the node RB#1 in the state of FIG. 29.

DESCRIPTION OF EMBODIMENT

According to the TRILL technology, a Layer 2 switch learns the topology of a network by communicating with other switches on the network. Subsequently, the Layer 2 switch autonomously decides on a communication path, in accordance with a designated protocol, for each packet identified by a Virtual Local Area Network Identification (VLAN ID), for example. At this point, one communication path is selected from among multiple communication paths that have been selected to yield a minimum cost, or in other words, an ECMP.

An autonomously determined communication path is arbitrarily changed by an operator's command input when, for example, establishing a communication path that paths around a specific Layer 2 switch in order to perform maintenance work on that switch, or when distributing data flows to balance the bandwidth of each communication path. Note that command input is conducted via a command-line interface (CLI) or the like.

However, according to TRILL technology, if a Layer 2 switch detects a link failure at some location on the network, for example, the communication path is autonomously reset. For this reason, the communication path set by the operator's command input is reverted back to an autonomously determined communication path, producing problems such as interrupted communication.

Accordingly, the embodiment discussed herein has been devised in light of the above issues, and take as an object to provide a packet forwarding device and a packet forwarding method with improved communication path control.

In a packet forwarding method described in this specification, for at least one of multiple nodes on a network, a packet is forwarded to a next node on a communication path set by command input received from an operator. Upon detecting a link failure with a next node on the communication path set by the command input, the packet forwarding destination is switched to a next node on an autonomously set communication path. Upon detecting a link failure at another location on the network, the packet forwarding destination is maintained.

A packet forwarding device and a packet forwarding method described in this specification exhibits the advantageous effect of improving communication path control.

Figure 1:
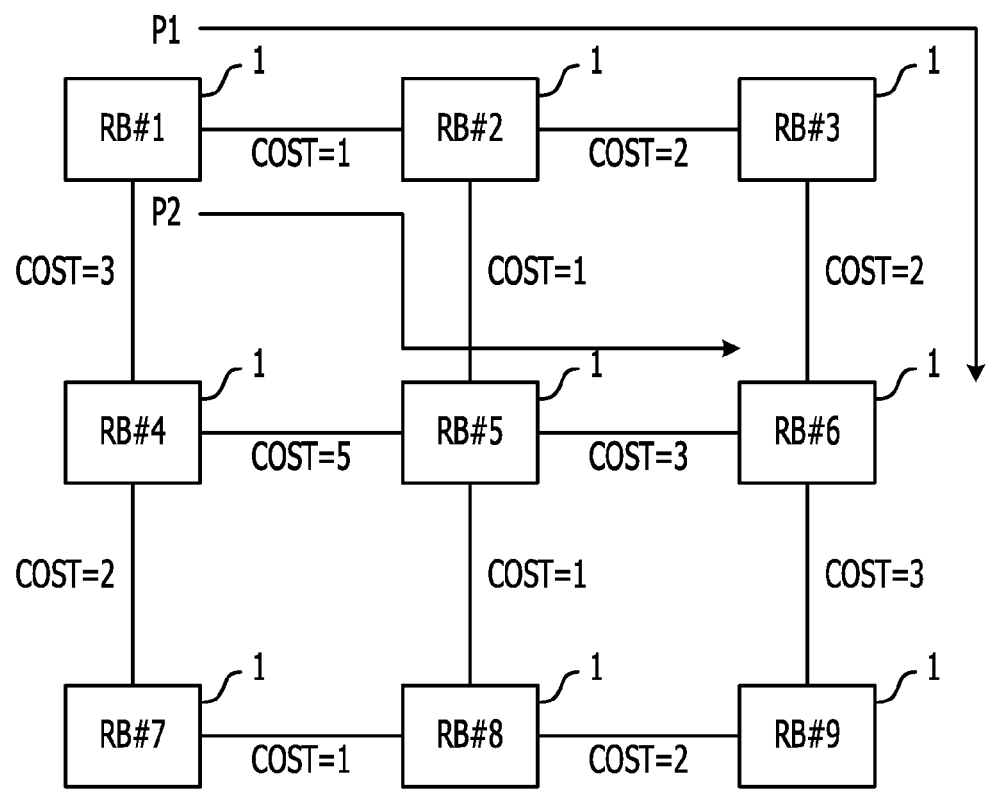
FIG. 1 is a configuration diagram illustrating an example of a network of packet forwarding devices.

SPF and ECMP in the TRILL technology will be described with reference to FIGS. 1 and 2. FIG. 1 is a configuration diagram illustrating an example of a network of packet forwarding devices.

A packet forwarding device 1 is respectively provided in multiple nodes RB#1 to RB#9 that are interconnected to form a mesh network. The packet forwarding devices 1 are interconnected via LAN cable or optical fiber. The packet forwarding devices 1 function as Layer 2 switches that forward packets between nodes. A packet may be, for example, an Ethernet (registered trademark) frame given a VLAN ID as a packet identifier, or a frame obtained by encapsulating an Ethernet frame according to a designated format.

The packet forwarding device 1 of each node RB#1 to RB#9 learns neighboring relationships on the network with a protocol called Hello exchange. Consequently, the packet forwarding device 1 acquires node identifiers of neighboring nodes, or device IDs of packet forwarding devices 1. For example, the packet forwarding device 1 of the node RB#1 acquires RB#2 and RB#3 as node identifiers of neighboring nodes.

Also, the packet forwarding device 1 learns the network topology with a protocol called Link State Protocol Data Unit (LSP) exchange. In LSP exchange, each packet forwarding device 1 outputs LSP frames generated by that device itself as well as LSP frames received from other devices on all ports. This is called flooding. Consequently, the packet forwarding device 1 learns the overall topology of the network, while also acquiring the cost of links between respective nodes, or in other words, link costs.

As illustrated in FIG. 1, a link cost is a parameter determined for each link, which is the smallest unit of a communication path. FIG. 2 is a table illustrating an example of link costs. A link cost has a value from 1 to 5 according to the communication rate of the link, for example. A lower number means a faster communication rate.

Each packet forwarding device 1 uses the SPF algorithm to autonomously compute the shortest communication path to other nodes, based on the link costs. For example, the packet forwarding device 1 of RB#1 computes a path traversing RB#2, RB#5, and RB#8 in that order as a communication path to RB#9, so that the total link cost is minimized. The link cost at this point is 1+1+1+2=5.

Also, the packet forwarding device 1 of RB#1 computes a path P1 traversing RB#2 and RB#3 in that order, and a path P2 traversing RB#2 and RB#5 in that order, as communication paths to RB#6. The paths P1 and P2 both have a total link cost of 5, and thus are treated as an ECMP. For this reason, the packet forwarding device 1 forwards packets distributed between the paths P1 and P2 according to VLAN ID, as discussed later.

Figure 3:
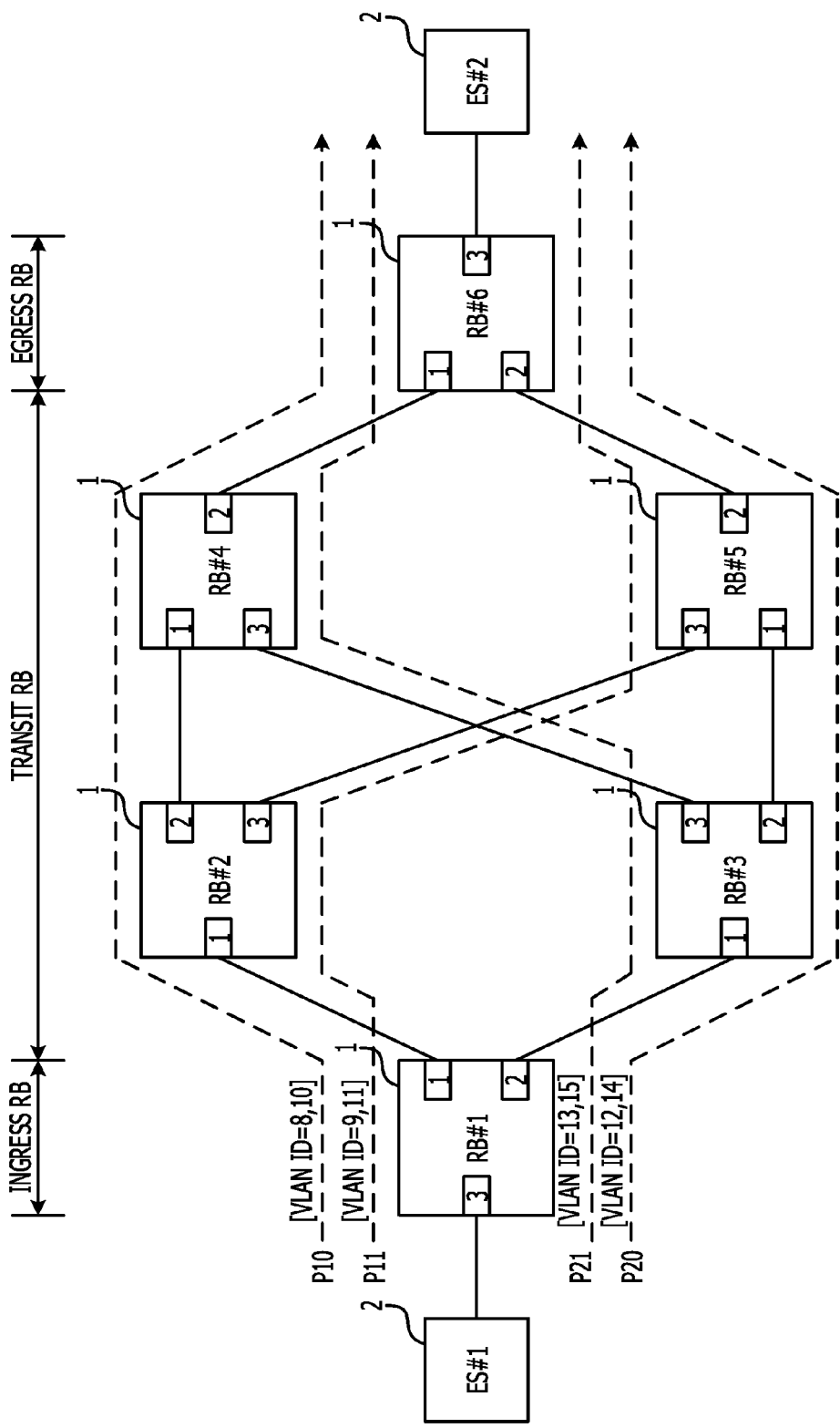
FIG. 3 is a network topology diagram illustrating an example of an ECMP.

Next, the distribution of packets into an ECMP will be discussed. FIG. 3 is a network topology diagram illustrating an example of an ECMP. The network in this example includes nodes ES#1, ES#2, and RB#1 to RB#6. An end station (a server, for example) is provided at the nodes ES#1 and ES#2, while the packet forwarding device 1 is provided at the nodes RB#1 to RB#6.

In FIG. 3, the framed numbers ([1] to [3]) in the nodes RB#1 to RB#6 indicate port numbers (ports #1 to #3) of the packet forwarding device 1. The connection configuration in this example will now be described. The packet forwarding device 1 of the node RB#1 is connected to the node RB#2 via the port #1, connected to the node RB#3 via the port #2, and connected to the node ES#1 via the port #3.

The packet forwarding device 1 of the node RB#2 is connected to the node RB#1 via the port #1, connected to the node RB#4 via the port #2, and connected to the node RB#5 via the port #3. The packet forwarding device 1 of the node RB#3 is connected to the node RB#1 via the port #1, connected to the node RB#5 via the port #2, and connected to the node RB#4 via the port #3.

The packet forwarding device 1 of the node RB#4 is connected to the node RB#2 via the port #1, connected to the node RB#6 via the port #2, and connected to the node RB#3 via the port #3. The packet forwarding device 1 of the node RB#5 is connected to the node RB#5 via the port #1, connected to the node RB#6 via the port #2, and connected to the node RB#2 via the port #3. The packet forwarding device 1 of the node RB#6 is connected to the node RB#4 via the port #1, connected to the node RB#5 via the port #2, and connected to the node ES#2 via the port #3.

The packet forwarding device 1 of each of the nodes RB#1 to RB#6 computes four ECMP communication paths P10, P11, P20, and P21 (see the dotted lines) as communication paths between the nodes ES#1 and ES#2, based on the above SPF. Each packet forwarding device 1, in order to identify packets, autonomously assigns the VLAN IDs given to packets to the respective communication paths P10, P11, P20, and P21.

FIG. 4 illustrates assignment of VLAN IDs to the communication paths P10, P11, P20, and P21. The communication path P10 traverses the nodes RB#1, RB#2, RB#4, and RB#6 in that order. The communication path P10 is assigned 8n and 8n+2 (where n=0, 1, 2, . . . , 511) as VLAN IDs.

The communication path P11 traverses the nodes RB#1, RB#2, RB#5, and RB#6 in that order. The communication path P11 is assigned 8n+1 and 8n+3 as VLAN IDs.

The communication path P21 traverses the nodes RB#1, RB#3, RB#4, and RB#6 in that order. The communication path P21 is assigned 8n+5 and 8n+7 as VLAN IDs.

The communication path P20 traverses the nodes RB#1, RB#3, RB#5, and RB#6 in that order. The communication path P20 is assigned 8n+4 and 8n+6 as VLAN IDs.

Consequently, as illustrated in FIG. 3, packets with the VLAN IDs 8 and 10 are forwarded according to the communication path P10, while packets with the VLAN IDs 9 and 11 are forwarded according to the communication path P11. Also, packets with the VLAN IDs 13 and 15 are forwarded according to the communication path P20, while packets with the VLAN IDs 12 and 14 are forwarded according to the communication path P21.

Note that the node RB#1 is positioned on the data input side of the communication paths P10, P11, P20, and P21, and is thus called an ingress RB, while the node RB#6 is positioned on the data output side of the communication paths P10, P11, P20, and P21, and is thus called an egress RB. Also, the nodes RB#2 to RB#5 are positioned at data relay points on the communication paths P10, P11, P20, and P21, and are thus called transit RBs.

Also, the present embodiment presents an example of distributing packets among an ECMP based on VLAN ID, but is not limited thereto. For example, packets may also be distributed among an ECMP based on a destination address (DA) and source address (SA) in the header of an Ethernet frame, or the destination IP address and source IP address of an Internet Protocol (IP) packet.

In this way, the packet forwarding device 1 autonomously sets the communication paths P10, P11, P20, and P21. However, in order to accommodate various demands and conditions, the packet forwarding device 1 may also modify the paths in accordance with command input received from an operator via a command input technology such as a CLI. Hereinafter, modifications of communication paths will be given.

Herein, as a modification (1) of communication paths by command input, the case of modifying communication paths for the purpose of adjusting the bandwidth of traffic flowing through the above communication paths P10, P22, P20, and P21 among the communication paths will be illustrated. Note that bandwidth does not refer to the link communication rate, but to the contract bandwidth guaranteed for use by users of the network.

Figure 5:
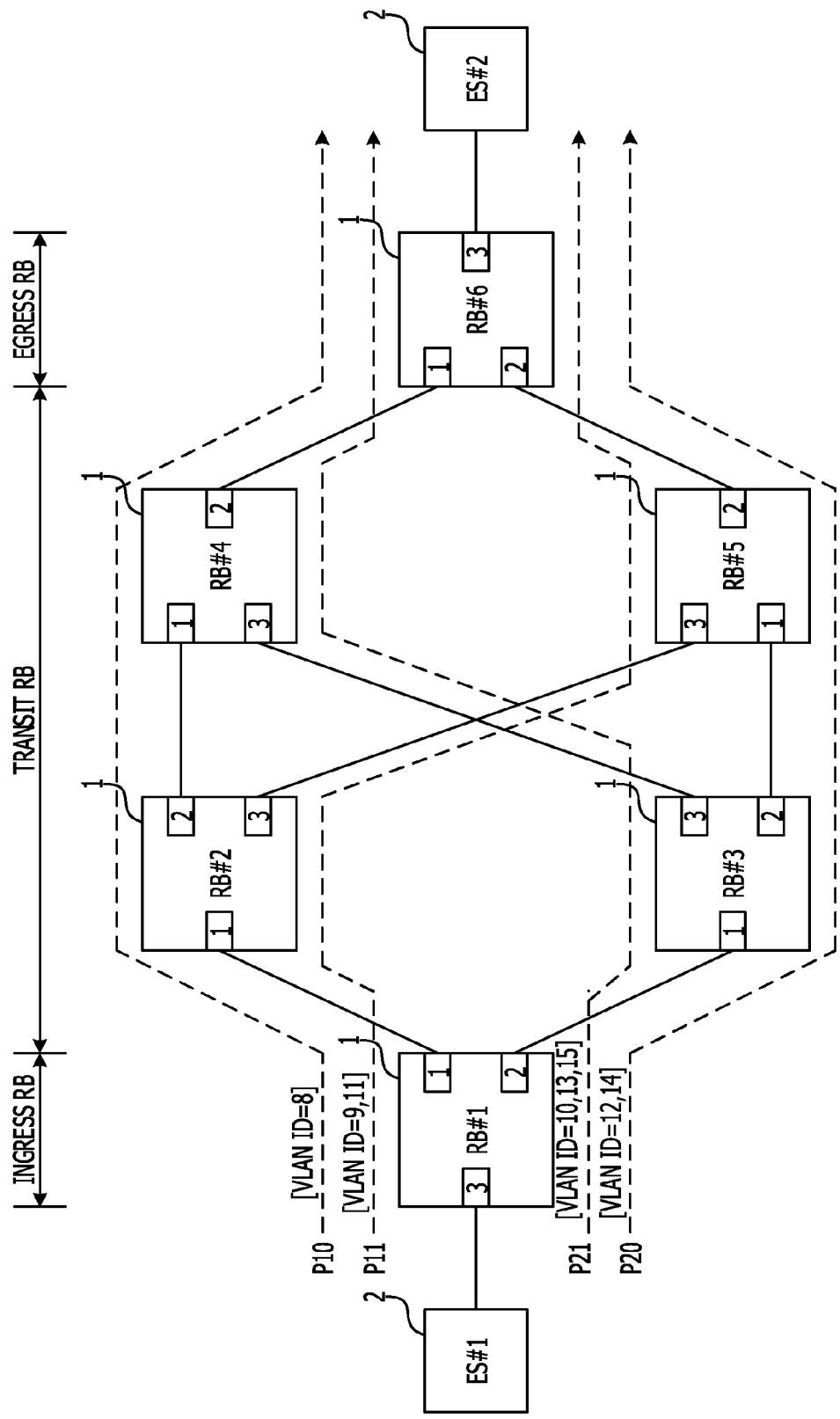
FIG. 5 is a network topology diagram illustrating a modification (1) of communication paths by command input.

FIG. 5 is a network topology diagram illustrating a modification (1) of communication paths modified by command input. As a comparison with FIG. 3 demonstrates, in this modification, the communication path P10 of the VLAN ID 10 is modified to the communication path P21.

FIG. 6 illustrates bandwidth totals for the individual communication paths P10, P11, P20, and P21 before and after modification. In FIG. 6, the bandwidth for each VLAN ID is stated in brackets [ ].

Before modification, the bandwidth totals of the communication paths P10, P11, P20, and P21 are 600 (Mbps), 400 (Mbps), 400 (Mbps), and 300 (Mbps), respectively. On the other hand, after modification, the bandwidth totals of the communication paths P10, P11, P20, and P21 are 500 (Mbps), 400 (Mbps), 400 (Mbps), and 400 (Mbps), respectively.

In this way, in this modification, by modifying the communication path by command input, the bandwidth differential between the communication paths P10 and P21 goes from 300 (Mbps) to 100 (Mbps), and the balance of bandwidth between these communication paths is adjusted.

As a modification (2) of communication paths by command input, in order to perform maintenance work on the packet forwarding device 1 of the node RB#5, the communication paths of the VLAN IDs 9, 11, 12, and 14 are modified so the communication paths P11 and P20 that include the node RB#5 are not used for packet forwarding.

Figure 7:
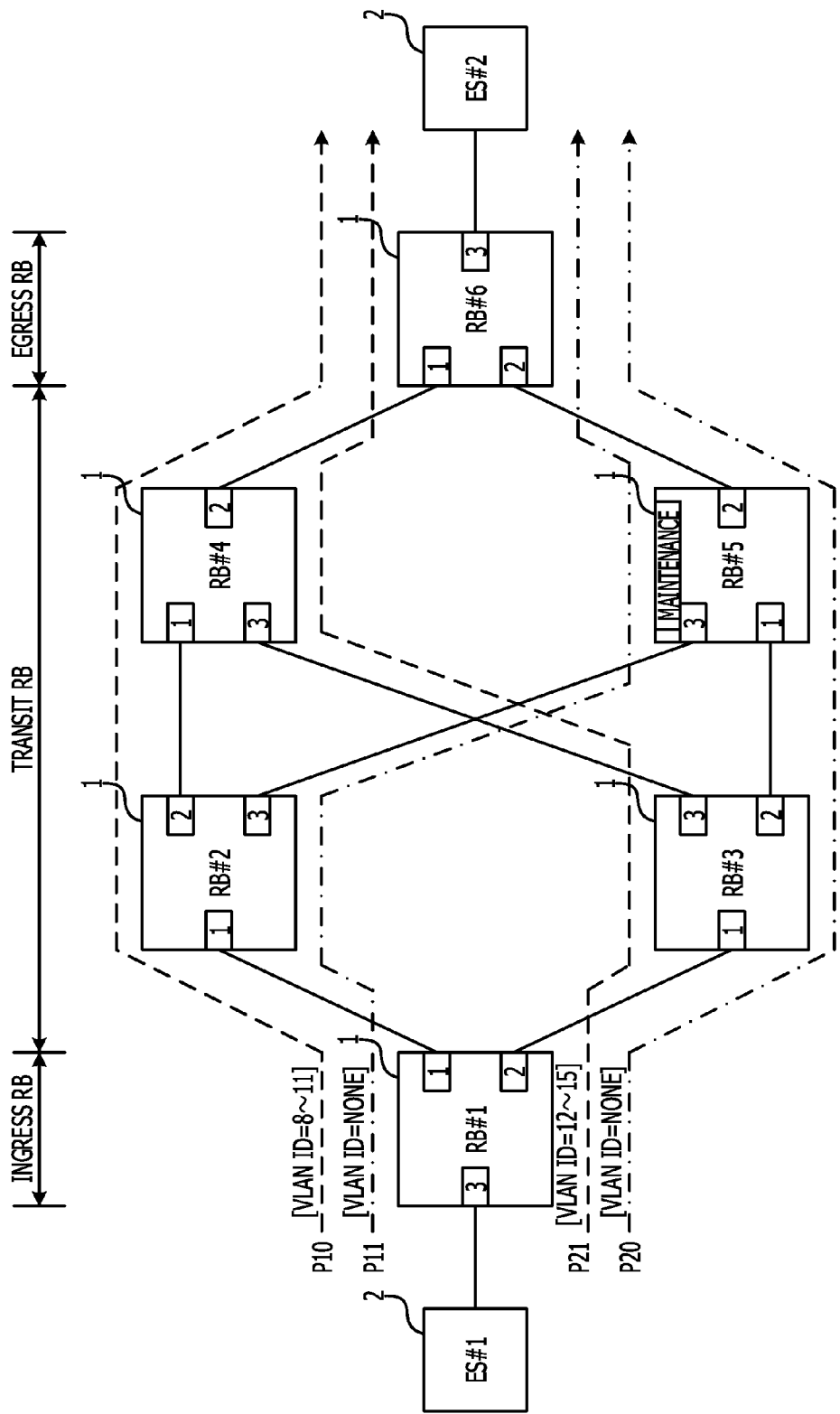
FIG. 7 is a network topology diagram illustrating a modification (2) of communication paths by command input.

FIG. 7 is a network topology diagram illustrating a modification (2) of communication paths by command input. In this modification, the VLAN IDs 9 and 11 are assigned to the communication path P10, while the VLAN IDs 12 and 14 are assigned to the communication path P21. Note that in FIG. 7, the label "VLAN ID=NONE" given to the communication paths P11 and P20 indicates that no VLAN IDs are assigned thereto.

FIG. 8 illustrates allocation of VLAN IDs to communication paths before and after modification and after link break as a comparative example. As a comparison of VLAN ID assignments before and after modification demonstrates, the communication paths of the VLAN IDs 9, 11, 12, and 14 are modified. Also, in the comparative example, each packet forwarding device 1 reverts the communication path settings back to the pre-modification state upon detecting a link break between any nodes on the network.

Figure 9:
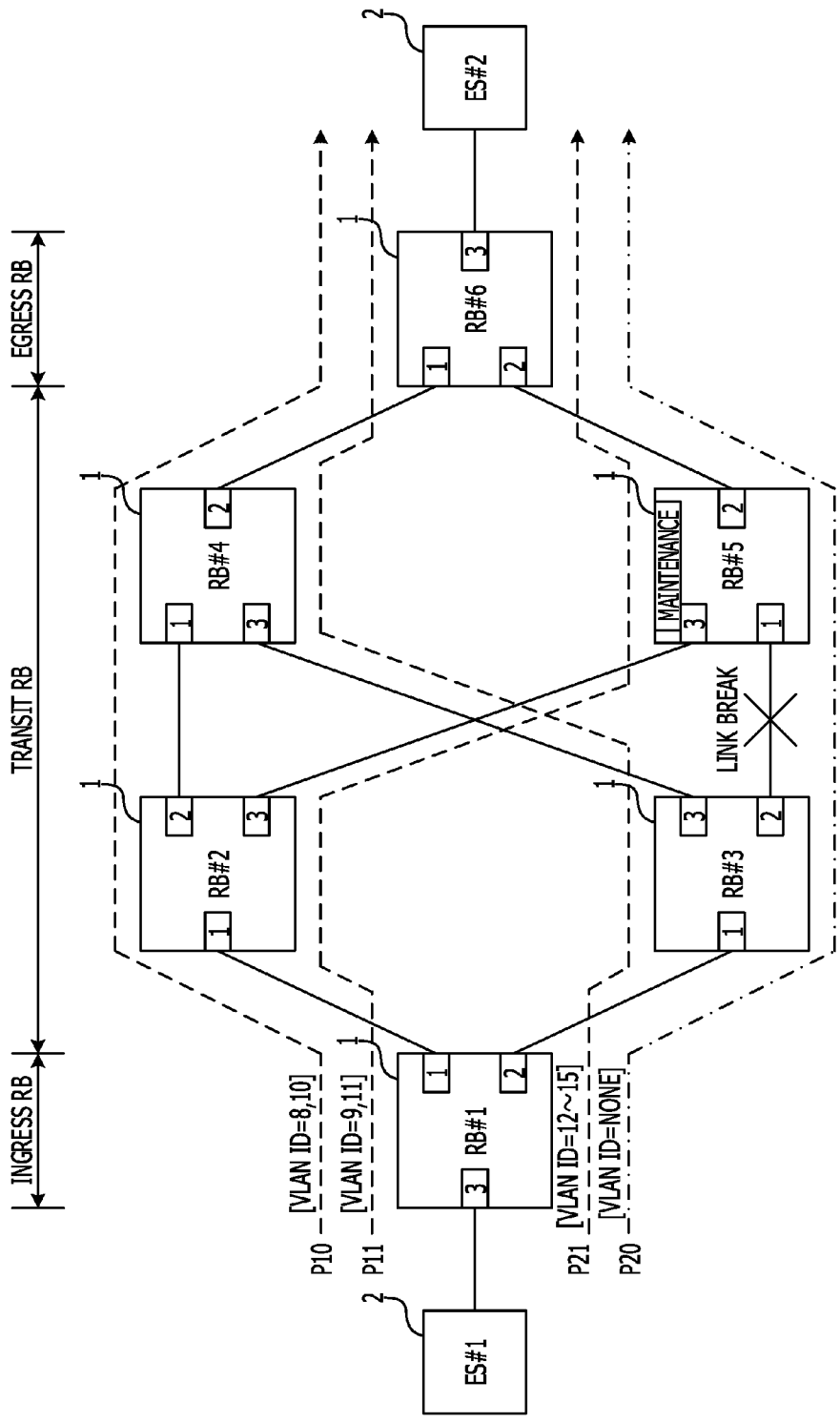
FIG. 9 is a network topology diagram illustrating communication paths after link break as a comparative example.

FIG. 9 is a network topology diagram illustrating communication paths after link break as a comparative example. When the LAN cable (or optical fiber) between the packet forwarding device 1 of the node RB#5 and the packet forwarding device 1 of the node RB#3 is removed from the devices in order to perform maintenance work on the packet forwarding device 1 of the node RB#5, a link break occurs (see the X mark). The occurrence of the link break is reported as a link failure, together with information indicating the failure location on the network, from the packet forwarding devices 1 of the nodes RB#3 and RB#5 to the packet forwarding devices 1 of the other nodes RB#1, RB#2, RB#4, and RB#6 with the above LSP frames.

When the link failure is detected, each packet forwarding device 1 switches the communication path P10 of the VLAN IDs 9 and 11 to the autonomously set communication path P11. Note that the communication path P21 of the VLAN IDs 12 and 14 is not switched, since the autonomously set communication path P20 includes the link on which the link failure occurred.

In this way, in the comparative example, by recalculating communication paths when triggered by the occurrence of a link failure, the communication path P10 set by command input for the VLAN IDs 9 and 11 is switched to an autonomously set communication path P11. For this reason, the communication of packets with the VLAN IDs 9 and 11 is interrupted.

The packet forwarding device 1 according to the embodiment improves communication path control by determining whether or not to switch the packet forwarding destination to the next node on an autonomously set communication path, according to whether or not a link failure exists with the next node on a communication path set by command input. Hereinafter, this packet forwarding method will be discussed in detail while presenting examples.

Figure 10:
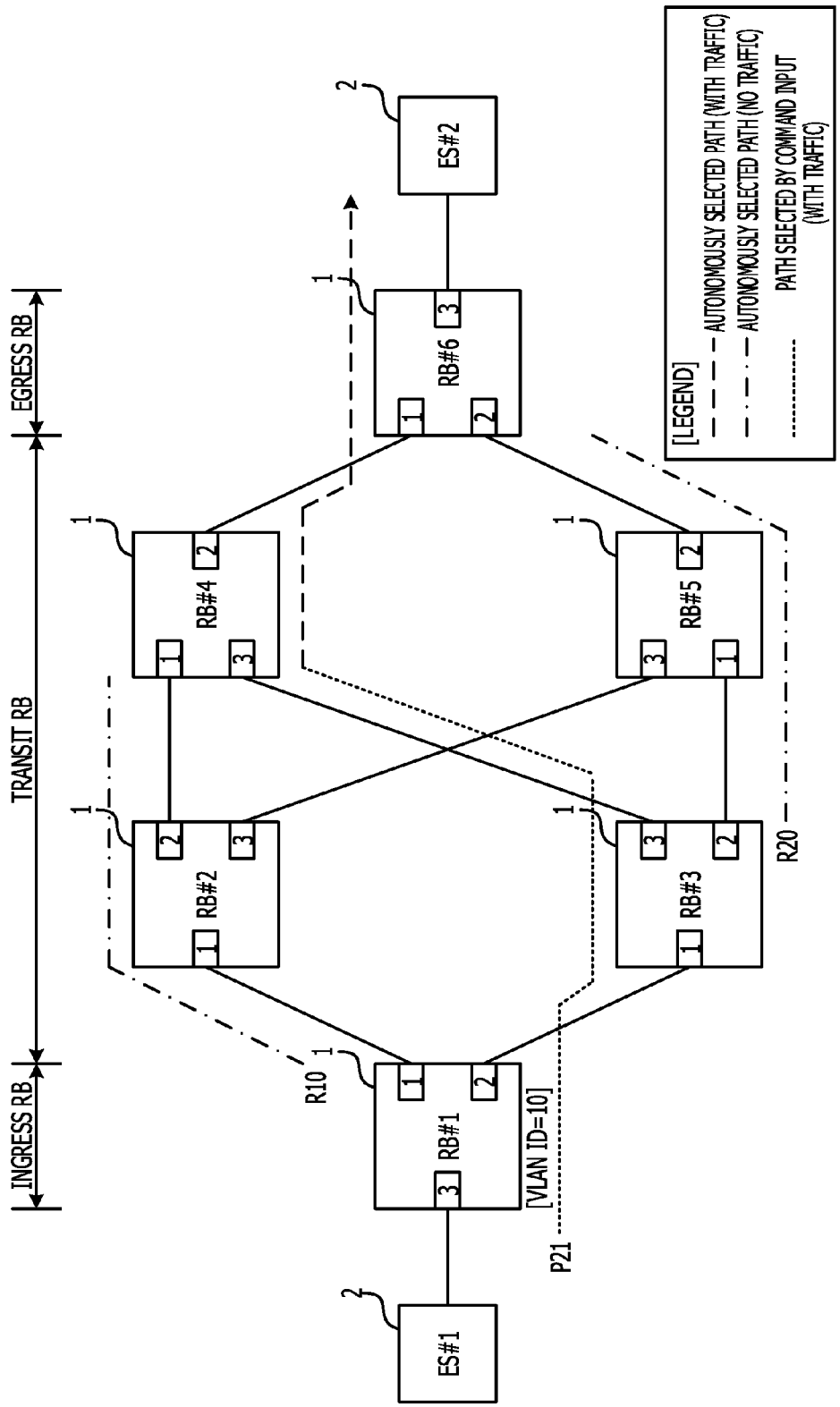
FIG. 10 is a network topology diagram illustrating an example of communication paths in an initial state.

FIG. 10 is a network topology diagram illustrating an example of communication paths in an initial state. In FIG. 10, the same signs are given to the configuration shared in common with FIG. 3, and description thereof will be reduced or omitted.

FIG. 10 illustrates an example of modifying the communication path of a packet with the VLAN ID 10 from an autonomously set communication path P10 to a communication path P21 with an operator's command input. Each packet forwarding device 1 selects a packet forwarding destination node according to the communication path.

More specifically, when a communication path set by command input does not exist, each packet forwarding device 1 takes the next node on the autonomously set communication path to be the packet forwarding destination node. On the other hand, when a communication path set by command input does exist, each packet forwarding device 1 takes the next node on the communication path set by command input to be the packet forwarding destination node. In other words, each packet forwarding device 1 decides on a packet forwarding destination node according to the communication path.

For example, for the VLAN ID 10, the packet forwarding devices 1 of the nodes RB#1 and RB#3 take the next nodes RB#3 and RB#4 on the communication path set by command input as the respective forwarding destination nodes. Also, for the VLAN ID 10, the packet forwarding device 1 of the node RB#4 takes the next node RB#6 on the autonomously set communication path as the forwarding destination node. Consequently, a communication path P21 traversing the nodes RB#1, RB#3, and RB#4 in that order is formed.

Also, the packet forwarding devices 1 of the nodes RB#1 and RB#2 respectively hold the settings of the next nodes RB#2 and RB#4 on the autonomously set communication path as indicated by the sign R10, even though the nodes RB#2 and RB#4 are not selected as forwarding destination nodes. Similarly, the packet forwarding devices 1 of the nodes RB#3 and RB#4 respectively hold the settings of the next nodes RB#5 and RB#6 on the autonomously set communication path as indicated by the sign R20, even though the nodes RB#5 and RB#6 are not selected as forwarding destination nodes.

In other words, the communication paths indicated by the signs R10 and R20 are only held as settings in the packet forwarding devices 1 of the nodes RB#1, RB#2, RB#5, and RB#6, and do not carry traffic. Note that the type of path for each link is distinguished by the line type, as indicated in the legend in FIG. 10.

Each packet forwarding device 1 selects a forwarding destination node based on a routing table stored in the device. FIG. 11 illustrates routing table settings for each of the nodes RB#1 to RB#5 in the state of FIG. 10. Note that although FIG. 11 illustrates an example in which the routing table only includes settings for the VLAN ID 10, settings for other VLAN IDs similarly exist.

In FIG. 11, the "Node" column indicates the nodes RB#1 to RB#5 at which a packet forwarding device 1 is installed. In other words, the "Node" column indicates the location of the routing table, or in other words, which node whose packet forwarding device 1 holds the routing table.

The "VLAN ID" column indicates the VLAN ID of a packet assigned to a communication path. The "Next Node ID" column indicates an identifier of the next node on that communication path, or in other words the identifier of the packet forwarding destination. The "Enabled/Disabled" column indicates whether the above "Next Node ID" is enabled or disabled.

The "Priority" column indicates the priority of the above "VLAN ID" and "Next Node ID". A next node ID with a priority of "High" (first identifier) indicates the next node on a communication path set by command input for that VLAN ID. On the other hand, a next node ID with a priority of "Low" (second identifier) indicates the next node on an autonomously set communication path for that VLAN ID. Next node IDs are made to correspond with the port identifiers (ports #1 to #3) in each packet forwarding device 1.

Each packet forwarding device 1 prioritizes a next node ID with a priority of "High" over a next node ID with a priority of "Low" as the packet forwarding destination. In other words, each packet forwarding device 1, in the case in which an enabled next node ID with a priority of "High" exists in the device's own routing table, takes that next node ID to be the packet forwarding destination. On the other hand, in the case in which a next node ID with a priority of "High" does not exist in the device's own routing table, or in the case in which the next node ID with a priority of "High" is disabled, each packet forwarding device 1 takes the next node ID with a priority of "Low" to be the packet forwarding destination.

For the packet forwarding devices 1 of the nodes RB#1 and RB#3, an enabled next node ID with a priority of "High" exists in each device's own routing table, and thus the next nodes RB#3 and RB#4 on the communication path set by command input are respectively taken to be the forwarding destination nodes. Meanwhile, the enabled next node IDs RB#2 and RB#4 with a priority of "Low" are held as settings in the routing tables of the nodes RB#1 and RB#3, but traffic does not flow through this communication path, as discussed above.

On the other hand, for the packet forwarding devices 1 of the other nodes RB#2, RB#4, and RB#5, an enabled next node ID with a priority of "High" does not exist in each device's own routing table, and thus the nodes RB#4, RB#6, and RB#6 indicated by the next node IDs with a priority of "Low" are respectively taken to be the forwarding destination nodes. In other words, the packet forwarding devices 1 of the nodes RB#2, RB#4, and RB#5 take the next nodes RB#4, RB#6, and RB#6 on the autonomously set communication paths as the respective forwarding destination nodes. Note that the next node IDs of the nodes RB#2 and RB#5 are only held as settings, and traffic does not flow these communication paths, as discussed above.

Figure 12:
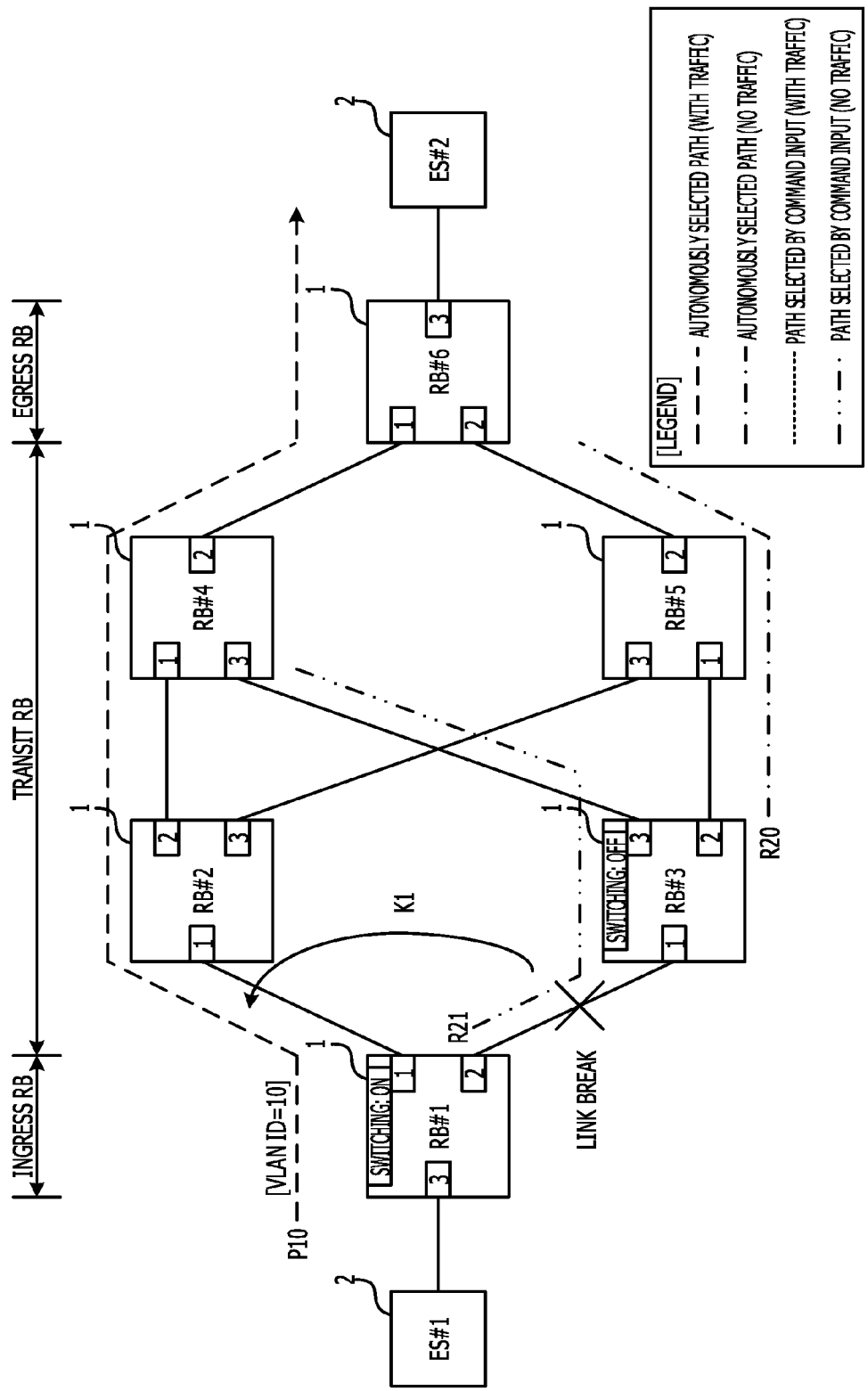
FIG. 12 is a network topology diagram illustrating an example (1) of communication paths after a link failure occurs.

FIG. 12 is a network topology diagram illustrating an example (1) of communication paths after a link failure occurs. This example presents the case of a link failure occurring between the node RB#1 and the node RB#3. Because of this link failure, traffic ceases to flow on the path R21 traversing the node RB#1, the node RB#3, and the node RB#4.

Since the link failure occurred with the next node RB#3 on the communication path set by command input, the packet forwarding device 1 of the node RB#1 switches the forwarding destination node from the node RB#3 to the node RB#2 as indicated by the sign K1 (see "Switching: On"). Consequently, the communication path for the VLAN ID 10 is modified from the path P21 (see FIG. 10) to the path P10, and the link failure is avoided.

Meanwhile, the packet forwarding device 1 of the node RB#3 keeps the forwarding destination node at the node RB#4 without switching (see "Switching: Off"). For this reason, the setting of the path R21 between the node RB#3 and the node RB#4 may be held as a provision against the case of reverting back to the original communication path P21 after recovering from the link failure. However, the path R21 only exists as a setting, and does not carry traffic. Note that the type of path for each link is distinguished by the line type, as indicated in the legend in FIG. 12.

FIG. 13 illustrates an example (1) of routing table settings for each of the nodes RB#1 to RB#5 in the state of FIG. 12. The packet forwarding device 1 of the node RB#1, in response to the occurrence of the link failure, disables ("Enabled/Disabled"="Disabled") the next node ID with a priority of "High". For this reason, the packet forwarding device 1 of the node RB#1 selects the node RB#2 indicated by the next node ID with a priority of "Low", or in other words the next node RB#2 on the autonomously set communication path, as the forwarding destination node. Consequently, the communication path for the VLAN ID 10 is modified from the path P21 (see FIG. 10) to the path P10.

Also, when recovering from the link failure, the packet forwarding device 1 may select whether or not to revert the communication path back to the state before the link failure occurred, in accordance with a path recovery setting that is set by command input from the operator. For example, if the command "path_recovery_enable" is input from a terminal device, the packet forwarding device 1 enables the path recovery setting. In this case, after link failure recovery, the packet forwarding device 1 of the node RB#1 enables (see FIG. 11) the next node ID with a priority of "High" by modifying the "Enabled/Disabled" setting to "Enabled".

Consequently, after link failure recovery, the communication path for the VLAN ID 10 is reverted from the path P10 (see FIG. 12) to the path P21 (see FIG. 10). In other words, in the case of detecting recovery from a link failure with the next node on a communication path set by command input, the packet forwarding destination is reverted back to the next node on the communication path set by command input. Consequently, after link failure recovery, the burden of reconfiguring a communication path set by command input is reduced or omitted.

On the other hand, if the command "path_recovery_disable" is input, the packet forwarding device 1 disables the path recovery setting. In this case, after link failure recovery, the packet forwarding device 1 of the node RB#1 keeps the "Enabled/Disabled" setting at "Disabled", and still takes the communication path for the VLAN ID 10 to be the path P10 (see FIG. 12) even after recovering from the link failure.

In this way, when the path recovery setting is disabled, after recovering from a link failure, the communication path does not revert back to the state before the link failure occurred. Consequently, in this case, the packet forwarding device 1 of the node RB#1 may also delete the next node ID with a priority of "High" when the link failure occurs.

FIG. 14 illustrates an example (2) of routing table settings for each of the nodes RB#1 to RB#5 in the state of FIG. 12. In this case, the packet forwarding device 1 of the node RB#1 deletes the next node ID with a priority of "High" when a link failure occurs. Consequently, similarly to the case of FIG. 13, the packet forwarding device 1 of the node RB#1 selects the node RB#2 indicated by the next node ID with a priority of "Low" as the forwarding destination node, and the communication path for the VLAN ID 10 is modified from the path P21 (see FIG. 10) to the path P10.

Figure 15:
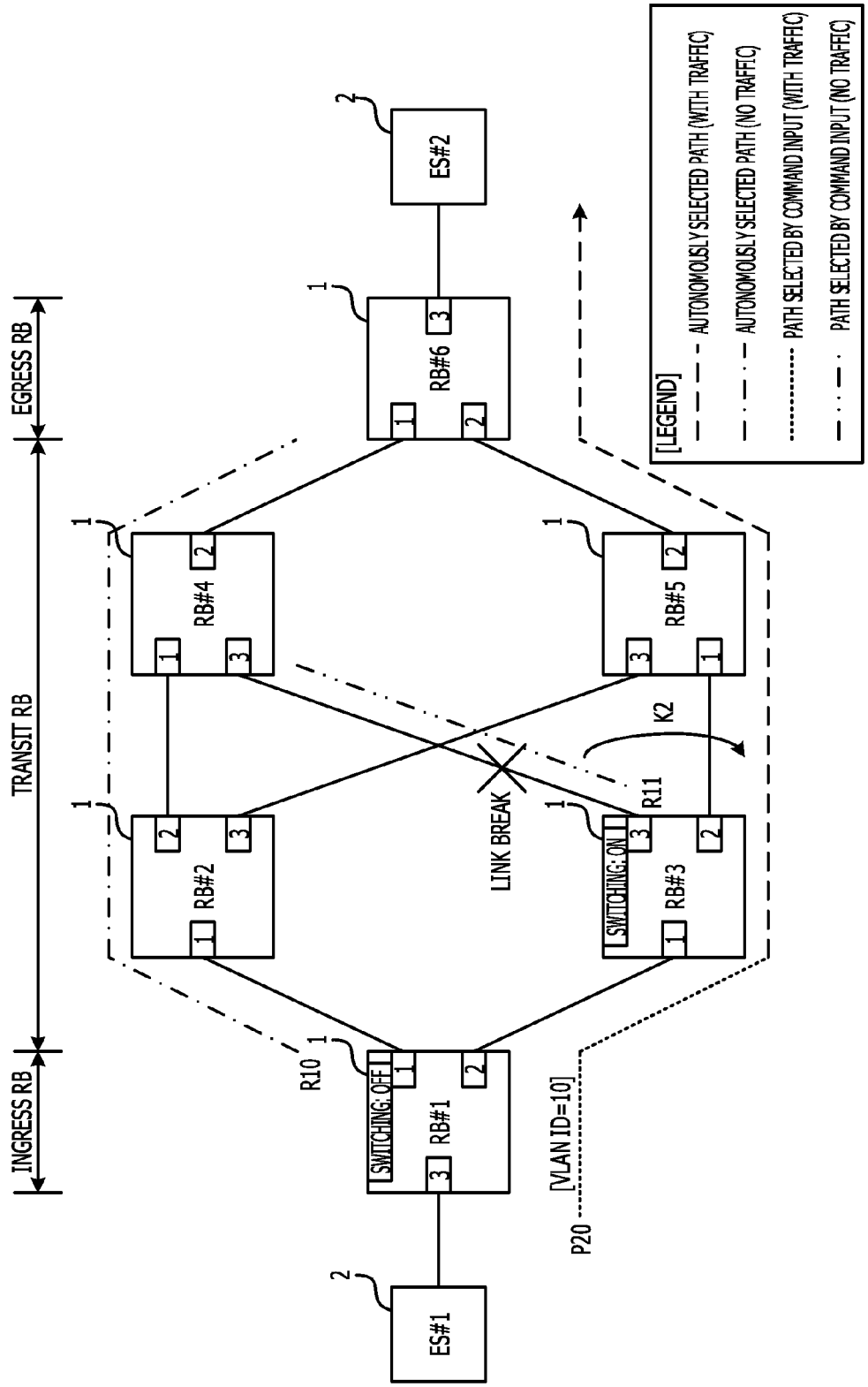
FIG. 15 is a network topology diagram illustrating an example (2) of communication paths after a link failure occurs.

In addition, FIG. 15 is a network topology diagram illustrating an example (2) of communication paths after a link failure occurs. This example presents the case of a link failure occurring between the node RB#3 and the node RB#4. Because of this link failure, traffic ceases to flow on the path R11 between the node RB#3 and the node RB#4. Note that the type of path for each link is distinguished by the line type, as indicated in the legend in FIG. 15.

Since the link failure occurred with the next node RB#4 on the communication path set by command input, the packet forwarding device 1 of the node RB#3 switches the forwarding destination node from the node RB#4 to the node RB#5 as indicated by the sign K2 (see "Switching: On"). Consequently, the communication path for the VLAN ID 10 is modified from the path P21 (see FIG. 10) to the path P20, and the link failure is avoided.

Meanwhile, since the forwarding destination node has been switched by the packet forwarding device 1 of the node RB#3, the packet forwarding device 1 of the node RB#1 keeps the forwarding destination node at the node RB#3 without switching (see "Switching: Off").

FIG. 16 illustrates an example (1) of routing table settings for each of the nodes in the state of FIG. 15. The packet forwarding device 1 of the node RB#3, in response to the occurrence of the link failure, disables ("Enabled/Disabled" setting="Disabled") the next node ID with a priority of "High". For this reason, the packet forwarding device 1 of the node RB#3 selects the node RB#5 indicated by the next node ID with a priority of "Low", or in other words the next node RB#5 on the autonomously set communication path, as the forwarding destination node. Consequently, the communication path for the VLAN ID 10 is modified from the path P21 (see FIG. 10) to the path P20.

After recovering from a link failure, when the above path recovery setting is enabled, the packet forwarding device 1 of the node RB#1 enables (see FIG. 11) the next node ID with a priority of "High" by modifying the "Enabled/Disabled" setting to "Enabled". Consequently, after link failure recovery, the communication path for the VLAN ID 10 is reverted from the path P20 (see FIG. 15) to the path P21 (see FIG. 10). On the other hand, when the path recovery setting is disabled, the communication path for the VLAN ID 10 stays set at the path P20, and thus the packet forwarding device 1 of the node RB#1 may also delete the next node ID with a priority of "High" when the link failure occurs.

FIG. 17 illustrates an example (2) of routing table settings for each of the nodes RB#1 to RB#5 in the state of FIG. 15. In this case, the packet forwarding device 1 of the node RB#3 deletes the next node ID with a priority of "High" when a link failure occurs. Consequently, similarly to the case of FIG. 15, the packet forwarding device 1 of the node RB#3 selects the node RB#5 indicated by the next node ID with a priority of "Low" as the forwarding destination node, and the communication path for the VLAN ID 10 is modified from the path P21 (see FIG. 10) to the path P20.

Figure 18:
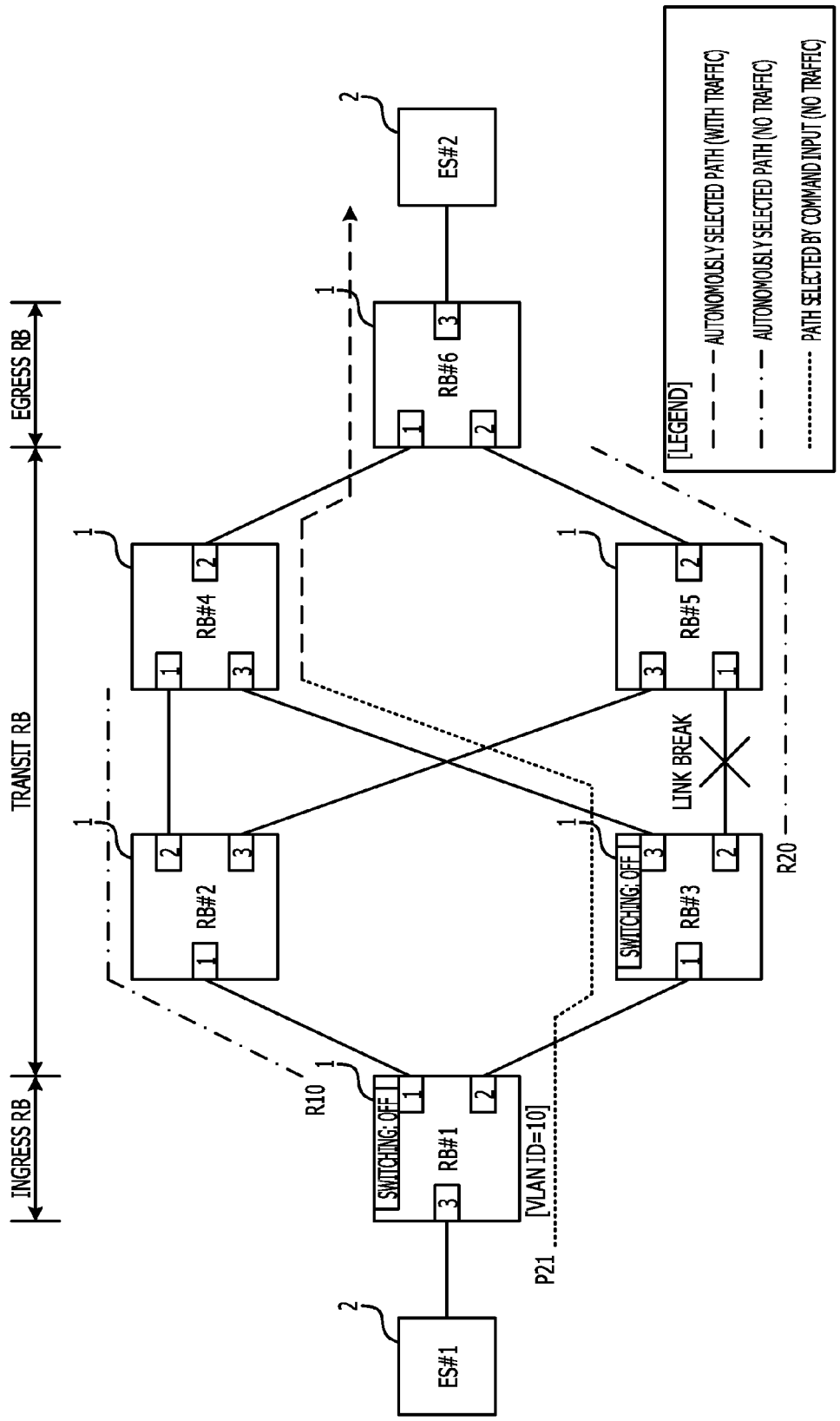
FIG. 18 is a network topology diagram illustrating an example (3) of communication paths after a link failure occurs.

FIG. 18 is a network topology diagram illustrating an example (3) of communication paths after a link failure occurs. This example presents the case of a link failure occurring between the node RB#3 and the node RB#5. Note that the type of path for each link is distinguished by the line type, as indicated in the legend in FIG. 18.

For the packet forwarding devices 1 of the nodes RB#1 and RB#3, the failure location of the link failure is not on the way to the next node on the communication path set by command input, and does not affect the communication of packets with the VLAN ID 10. For this reason, the packet forwarding devices 1 of the nodes RB#1 and RB#3 do not switch the forwarding destination node. In other words, the packet forwarding devices 1 of the nodes RB#1 and RB#3 respectively maintain the nodes #3 and #4 as forwarding destination nodes. For this reason, the routing tables in this example become like that illustrated in FIG. 11.

In this way, for at least one of the multiple nodes RB#1 to RB#6 on the network, packets are forwarded to the next node on a communication path set by command input received from the operator. Subsequently, in the case of detecting a link failure with the next node on a communication path set by command input, the packet forwarding destination is switched to the next node on an autonomously set communication path. Meanwhile, in the case of detecting a link failure at another location on the network, the packet forwarding destination is maintained.

Consequently, in the case in which communication via a communication path set by command input becomes unavailable due to the occurrence of a link failure, the communication path is switched so as to avoid the link failure, and communication continues. On the other hand, even if a link failure occurs, when communication via a communication path set by command input is still available, the packet forwarding destination is maintained without switching, and thus that communication path is also maintained, improving convenience. In other words, in this case, problems like those discussed with reference to FIG. 9 do not occur.

Figure 19:
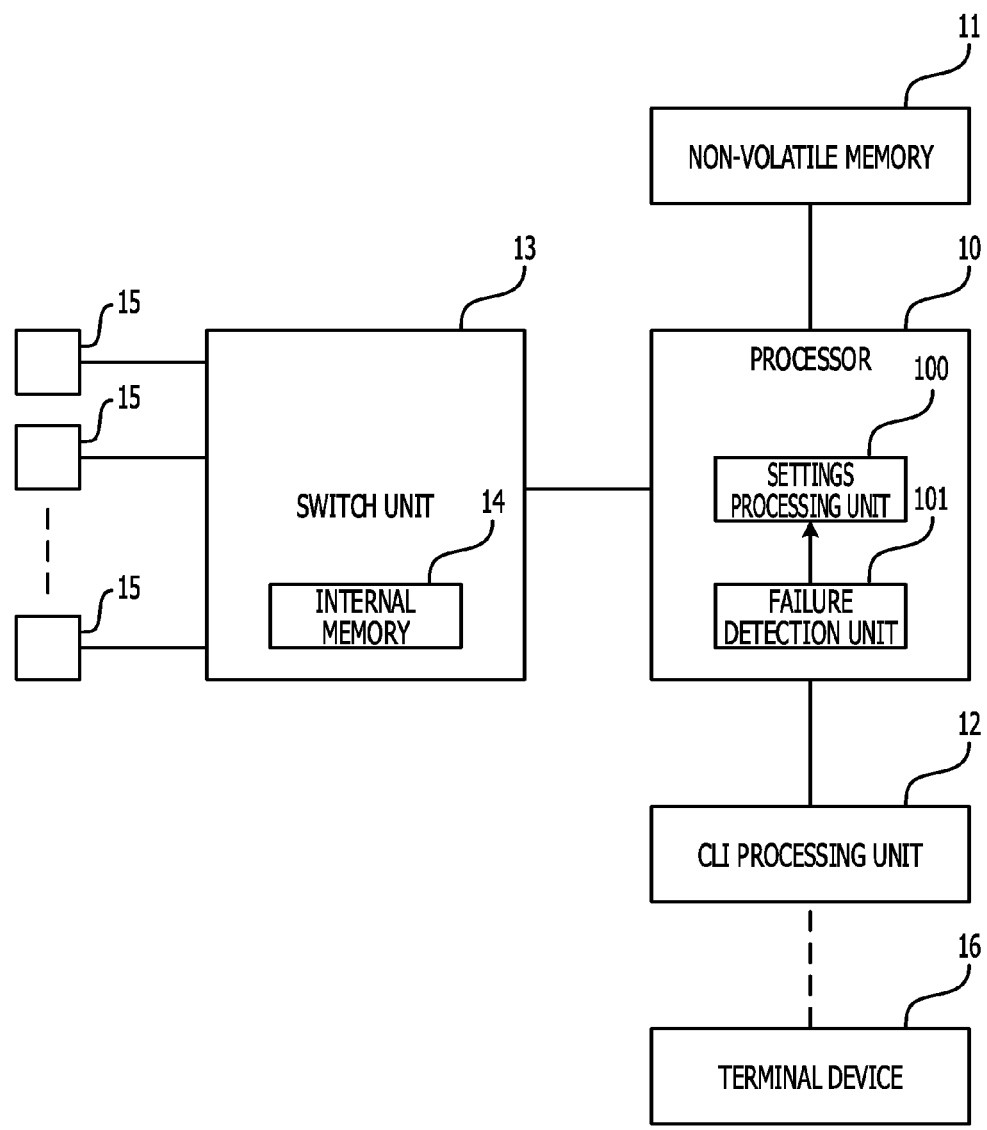
FIG. 19 is a configuration diagram illustrating a functional configuration of a packet forwarding device.

Next, a configuration of a packet forwarding device 1 according to the embodiment will be discussed. FIG. 19 is a configuration diagram illustrating a functional configuration of a packet forwarding device 1.

The packet forwarding device 1 includes a processor 10, non-volatile memory 11, a CLI processing unit 12, a switch unit 13 that includes internal memory 14, and multiple ports 15. The multiple ports 15 include a connector that connects a LAN cable or optical fiber, and a PHY/MAC chip that conducts processing in the physical layer and the MAC layer. The multiple ports 15 are respectively connected to the multiple nodes ES#1, ES#2, and RB#1 to RB#6 on the network, and transmit and receive packets.

The switch unit 13 switches packets among the multiple ports 15 in accordance with the routing table discussed earlier. Consequently, packets are forwarded among the multiple nodes ES#1, ES#2, and RB#1 to RB#6.

The internal memory (storage unit) 14 stores a routing table. Next node IDs in the routing table correspond with the ports 15 in a 1-to-1 relationship. For this reason, the switch unit 13 references the routing table stored in the internal memory 14, and forwards a packet to the port 15 corresponding to the next node ID selected as the forwarding destination node according to the VLAN ID of the packet. Note that, instead of the internal memory 14, memory provided externally to the switch unit 13 may also be used.

The processor 10 is a computational processing circuit such as a central processing unit (CPU), and controls the overall behavior of the packet forwarding device 1. The non-volatile memory 11 is flash memory, for example, and stores information such as a program that drives the processor 10. The processor 10 operates by reading out a program from the non-volatile memory 11 at boot-up. Note that, although not illustrated in the drawings, the processor 10 includes work memory used to operate.

As a result of the processor 10 reading out a program, a settings processing unit 100 and a failure detection unit 101 are formed as functions. The settings processing unit 100 sets the routing table by accessing the internal memory 14 of the switch unit 13. The settings processing unit 100 executes the SPF and ECMP functions discussed with reference to FIGS. 1 and 2, and autonomously sets communication paths. In the case of autonomously setting a communication path, the settings processing unit 100 sets next node IDs with a priority of "Low" in the routing table. Note that the settings processing unit 100 and the failure detection unit 101 are not limited to software, and may also be configured by hardware.

The CLI processing unit (receiving unit) 12 receives command input from an operator. The CLI processing unit is connected to an external terminal device 16 via a LAN cable or the like, processes commands input by the operator using the terminal device 16, and outputs processing content to the processor 10. Note that the terminal device 16 may be a personal computer or the like, for example.

The settings processing unit 100 sets the routing table so that, from among the multiple nodes, packets are forwarded to the next node on a communication path set by command input. In other words, the settings processing unit 100 sets next node IDs with a priority of "High" in the routing table, in accordance with command input.

Also, the settings processing unit 100 sets the path recovery setting discussed earlier, in accordance with command input. When the path recovery setting is enabled, the settings processing unit 100 configures the routing table so that, after recovering from a link failure, a communication path reverts back to the state before the link failure occurred. When the path recovery setting is disabled, the settings processing unit 100 maintains the routing table settings.

The failure detection unit 101 detects a link failure on the network. The switch unit 13, upon receiving an LSP frame, outputs the LSP frame to the settings processing unit 100. From information included in the LSP frame, the failure detection unit 101 detects occurrence of a link failure and the failure location, or alternatively, recovery from a link failure and the recovery location.

Figure 20:
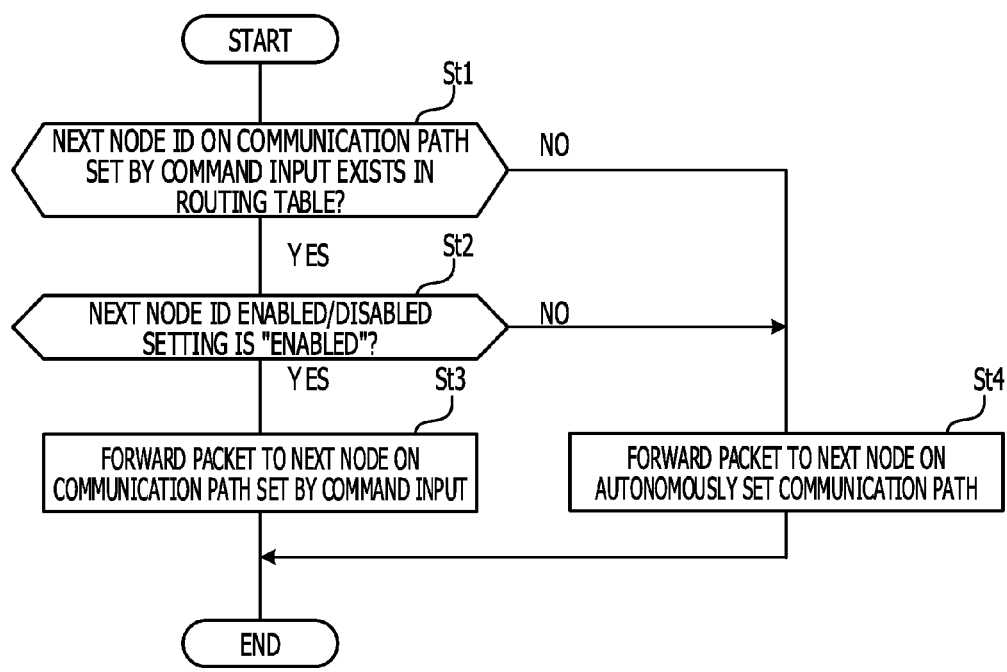
FIG. 20 is a flowchart illustrating a packet forwarding process.

Next, operation of a packet forwarding device 1 according to the embodiment will be described. FIG. 20 is a flowchart illustrating a packet forwarding process. This process is executed for each VLAN ID.

The switch unit 13 references the routing table in the internal memory 14, and detects whether or not a next node ID on a communication path set by command input exists (step St1). In other words, the switch unit 13 checks whether or not a next node ID with a priority of "High" exists in the routing table.

When a next node ID on a communication path set by command input does exist (step St1, YES), the switch unit 13 detects whether or not the "Enabled/Disabled" setting for that node ID is "Enabled" (step St2). When the "Enabled/Disabled" setting is "Enabled", (step St2, YES), the switch unit 13 forwards the packet to the next node on the communication path set by command input (step St3). In other words, the switch unit 13 outputs the packet to the port corresponding to a next node ID with a priority of "High".

Meanwhile, when a next node ID on a communication path set by command input does not exist (step St1, NO), the switch unit 13 forwards the packet to a next node on an autonomously set communication path (step St4). In other words, the switch unit 13 outputs the packet to the port corresponding to a next node ID with a priority of "Low". This process is similarly conducted when the "Enabled/Disabled" setting is "Disabled" (step St2, NO). In this way, a packet forwarding process is conducted.

In this way, a switch unit exchanges packets among multiple ports 15 while prioritizing a next node ID with a priority of "High" over a next node ID with a priority of "Low". For this reason, when an enabled communication path set by command input exists in the routing table, a packet is forwarded to the next node on that communication path, whereas otherwise the packet is forwarded to the next node on an autonomously set communication path. Consequently, in this embodiment, a forwarding destination node is easily determined according to next node IDs included a routing table.

Figure 21:
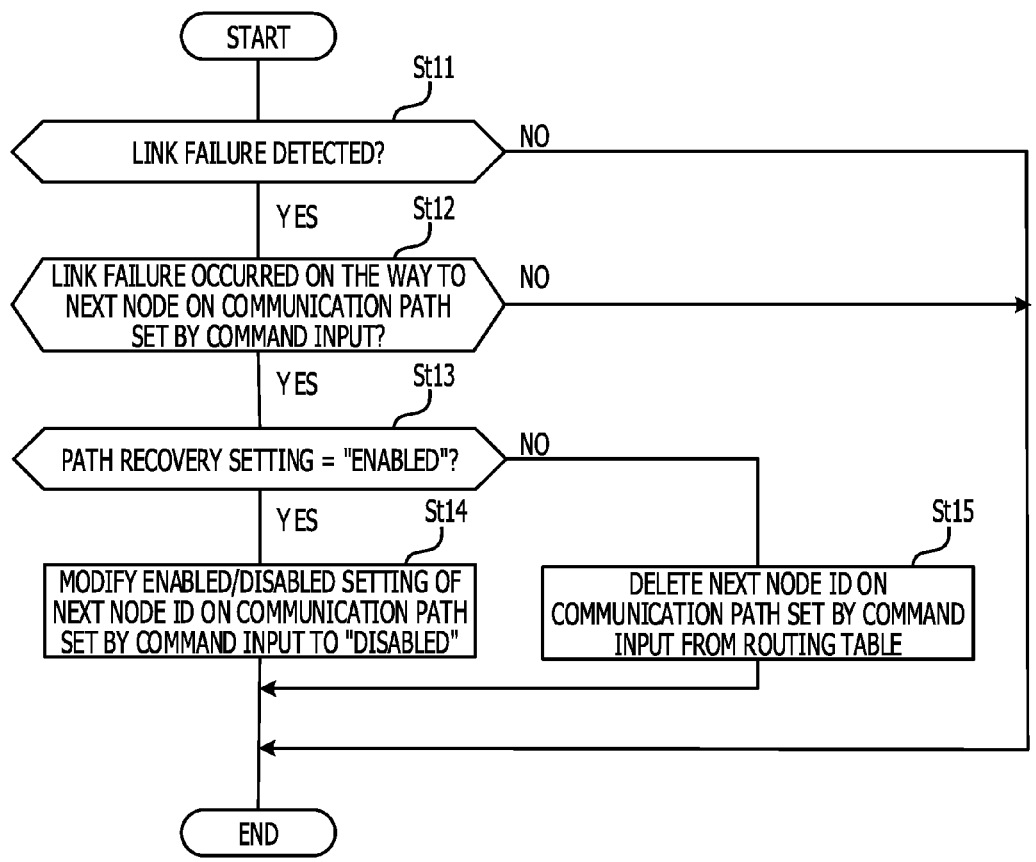
FIG. 21 is a flowchart illustrating a communication path control process when a link failure occurs.

FIG. 21 is a flowchart illustrating a communication path control process when a link failure occurs. The failure detection unit 101 determines whether or not a link failure has been detected, based on an LSP frame (step St11). When a link failure has not been detected (step St11, NO), the process ends.

When a link failure has been detected (step St11, YES), the failure detection unit 101 determines whether or not the link failure occurred on the way to the next node on a communication path set by command input, based on the LSP frame (step St12). In the case in which the link failure occurred at another location on the network (step St12, NO), the process ends.

In the case in which the link failure occurred on the way to the next node on a communication path set by command input (step St12, YES), the settings processing unit 100 determines whether or not the path recovery setting is enabled (step St13). When the path recovery setting is enabled (step St13, YES), the settings processing unit 100 modifies the "Enabled/Disabled" setting of the next node ID on the communication path set by command input to "Disabled" (step St14). In other words, the settings processing unit 100 disables the next node ID with a priority of "High".

When the path recovery setting is disabled (step St13, NO), the settings processing unit 100 deletes next node ID on the communication path set by command input from the routing table (step St15). In other words, the settings processing unit 100 deletes the next node ID with a priority of "High" from the routing table. In this way, a communication path control process when a link failure occurs is conducted.

If the processing in steps St14 and St15 is conducted, the switch unit 13, following the flow illustrated in FIG. 20, outputs the packet to the port corresponding to the next node ID with a priority of "Low". On the other hand, if the processing in steps St14 and St15 is not conducted, the switch unit 13, following the flow illustrated in FIG. 20, outputs the packet to the port corresponding to the next node ID with a priority of "High".

In this way, when the failure detection unit 101 detects a link failure with the next node on a communication path set by command input, the settings processing unit 100 deletes the next node ID with a priority of "High" from the routing table, or disables that next node ID. For this reason, the packet forwarding destination is switched to a next node on an autonomously set communication path, thereby avoiding the link failure.

On the other hand, when the failure detection unit 101 detects a link failure at another location on the network, the settings processing unit 100 maintains the routing table settings. For this reason, a packet is forwarded to the next node on a communication path set by command input, without switching the packet forwarding destination to the next node on an autonomously set communication path. Consequently, since problems like those described with reference to FIG. 9 are not produced, convenience is improved.

Figure 22:
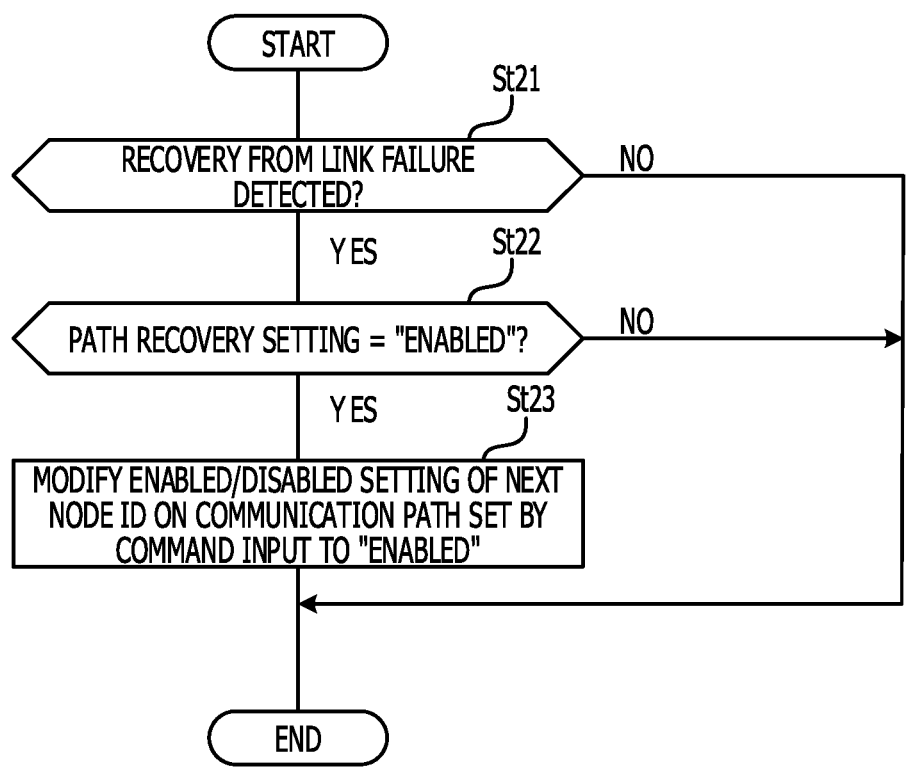
FIG. 22 is a flowchart illustrating a communication path control process when recovering from a link failure.

FIG. 22 is a flowchart illustrating a communication path control process when recovering from a link failure. The failure detection unit 101 determines whether or not recovery from a link failure has been detected, based on an LSP frame (step St21). When recovery from a link failure has not been detected (step St21, NO), the process ends.

When the failure detection unit 101 detects recovery from a link failure (step St21, YES), the settings processing unit 100 determines whether or not the path recovery setting is enabled (step St22). When the path recovery setting is disabled (step St22, NO), the process ends.

When the path recovery setting is enabled (step St22, YES), the settings processing unit 100 modifies the "Enabled/Disabled" setting of the next node ID on the communication path set by command input to "Enabled" (step St23). In other words, the settings processing unit 100 enables the next node ID with a priority of "High" in the routing table. In this way, a communication path control process when recovering from a link failure is conducted.

In this way, when the failure detection unit 101 detects recovery from a link failure with the next node on a communication path set by command input, the settings processing unit 100 enables the next node ID with a priority of "High". For this reason, after recovering from a link failure, the communication path reverts to the state before the link failure occurred (the communication path set by command input). Consequently, after link failure recovery, the burden of reconfiguring a communication path set by command input is reduced or omitted.

Next, a determination method for determining a forwarding destination node according to VLAN ID will be discussed. This determination method is autonomously executed in the settings processing unit 100 of each packet forwarding device 1. The settings processing unit 100 sets the determined forwarding destination node as the next node ID with a priority of "Low" in the routing table.

The forwarding destination node determination method differs according to whether the node of the packet forwarding device 1 is an ingress RB or a transit RB. Hereinafter, the forwarding destination node determination method will be illustrated by example, divided into the ingress RB case and the transit RB case. This example illustrates the case of obtaining the communication paths illustrated in FIG. 3 by distributing eight VLAN IDs 8 to 15 to four autonomously determined communication paths (ECMP).

FIGS. 23A to 23C illustrate a forwarding destination node determination method for an ingress RB. First, as illustrated in FIG. 23A, VLAN IDs are categorized into eight patterns "000" to "111", based on the least-significant three bits when expressing the VLAN IDs in binary (see "VLAN ID (bin.)").

Next, as illustrated in FIG. 23B, an output destination number according to the ECMP number (1 to 8) is assigned to each of the patterns. The ECMP number is the number of next nodes on an autonomously determined communication path. Referring to FIG. 3, the ingress node RB#1 has RB#2 and RB#2 as next nodes, and thus has an ECMP number of 2.

The output destination numbers (1 to 8) are numbers for mutually distinguishing output destinations equal to the ECMP number. Output destination numbers are assigned to yield the same numbers for each group obtained by equally dividing the patterns arranged in descending order into groups equal to the ECMP number. For example, when the ECMP number is 2, the output destination number "1" is assigned to the patterns "001" to "011", while the output destination number "2" is assigned to the patterns "100" to "111". Note that when the ECMP number is 1, the output destination number "1" is assigned to all patterns "000" to "111".

Next, as illustrated in FIG. 23C, a next node ID is assigned to each pattern. FIG. 23C illustrates assignment in the case of the node RB#1 in FIG. 3. The output destination numbers are made to correspond with next node IDs according to the arranged order of the numbers. Consequently, the output destination numbers "1" and "2" are made to respectively correspond to the nodes RB#1 and RB#3. Consequently, RB#2 is assigned as the next node ID for the VLAN IDs 8 to 11 (patterns "000" to "011"), while RB#3 is assigned as the next node ID for the VLAN IDs 12 to 15 (patterns "100" to "111").

FIGS. 24A to 24C illustrate a forwarding destination node determination method for a transit RB. As illustrated in FIG. 24A, VLAN IDs are categorized into patterns, similarly to FIG. 23A.

Next, as illustrated in FIG. 24B, an output destination number according to the ECMP number (1 to 8) is assigned to each of the patterns. The output destination numbers are assigned to the patterns arranged in descending order so as to repeat in descending order. For example, when the ECMP number is 2, the output destination number "1" is assigned to the patterns "000", "010", "100", and "110", while the output destination number "2" is assigned to the patterns "001", "011", "101", and "111". Note that when the ECMP number is 1, the output destination number "1" is assigned to all patterns "000" to "111".

Next, as illustrated in FIG. 24C, a next node ID is assigned to each pattern. FIG. 24C illustrates assignment in the case of the node RB#2 in FIG. 3. The output destination numbers are made to correspond with next node IDs according to the arranged order of the numbers. Accordingly, the output destination numbers "1" and "2" are made to respectively correspond to the nodes RB#4 and RB#5. Consequently, RB#4 is assigned as the next node ID for the VLAN IDs 8, 10, 12, and 14 (patterns "000", "010", "100", and "110"). Also, RB#5 is assigned as the next node ID for the VLAN IDs 9, 11, 13, and 15 (patterns "001", "011", "101", and "111"). Note that other nodes are likewise assigned by a similar technique.

In this way, when multiple autonomously set communication paths exist (when an ECMP exists), the settings processing unit 100 selects a next node ID on a communication path according to VLAN ID as the packet forwarding destination, so that packets are uniformly distributed to each communication path. Accordingly, it becomes possible to uniformly distribute multiple VLAN IDs to each path of the ECMP.

Figure 25:
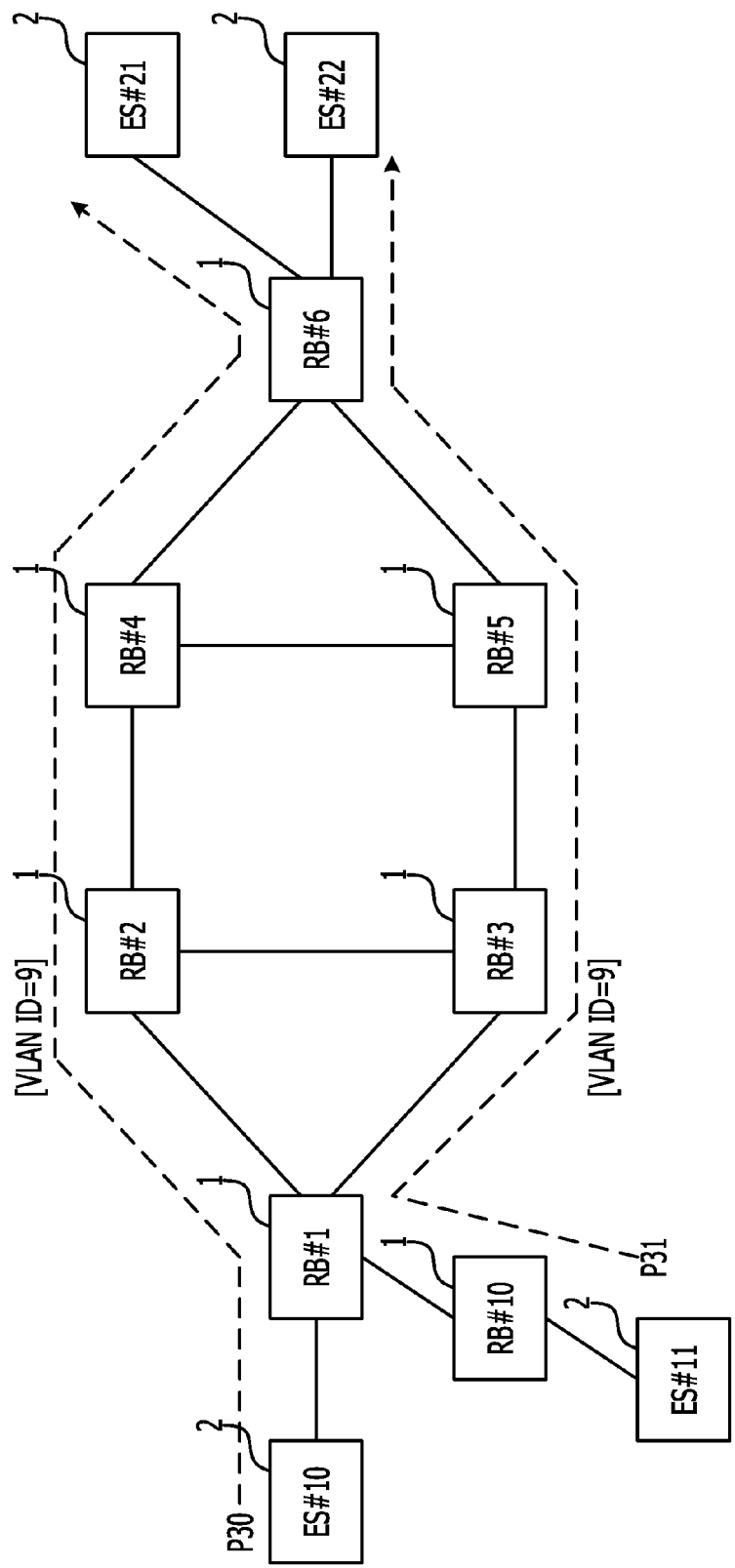
FIG. 25 is a network topology diagram illustrating an initial state of communication paths in another example of a network.

Next, operation of a packet forwarding device 1 according to the embodiment will be described by presenting another example of a network. FIG. 25 is a network topology diagram illustrating an initial state of communication paths in another example of a network.

The network includes nodes ES#10, ES#11, ES#20, and ES#21 at which an end station 2 is installed, and nodes RB#1 to RB#6 at which a packet forwarding device 1 is installed. In this network, a communication path P30 between the nodes ES#10 and ES#21, and a communication path P31 between the nodes ES#11 and ES#22, are autonomously set for the VLAN ID 9. In other words, on this network, different ECMPs coexist for the same VLAN ID. The communication path P30 traverses the nodes RB#1, RB#2, RB#4, and RB#6, while the communication path P31 traverses the nodes RB#10, RB#1, RB#3, RB#5, and RB#6.

FIG. 26 illustrates routing table settings for the node RB#1 in the state of FIG. 25. In the routing table, two varieties for the case of an ingress RB and a transit RB are provided as node types. The packet forwarding device 1 is able to determine whether the device's own node corresponds to an ingress RB or a transit RB for each of the communication paths P30 and P31 with the LSP exchange discussed earlier, for example.

Since the node RB#1 functions as an ingress RB on the communication path P30, the "Ingress RB" routing table is referenced for the communication path P30. The "Ingress RB" routing table is set using the forwarding destination node determination method discussed with reference to FIGS. 23A to 23C. Following this setting, the packet forwarding device 1 of the node RB#1 forwards a packet from the node ES#10 to the next node RB#2 on an autonomously set communication path.

On the other hand, since the node RB#1 functions as a transit RB on the communication path P31, the "Transit RB" routing table is referenced for the communication path P31. The "Transit RB" routing table is set using the forwarding destination node determination method discussed with reference to FIGS. 24A to 24C. Following this setting, the packet forwarding device 1 of the node RB#1 forwards a packet from the node ES#11 to the next node RB#2 on an autonomously set communication path. Note that FIG. 25 omits illustration of communication paths other than for VLAN ID 9.

Figure 27:
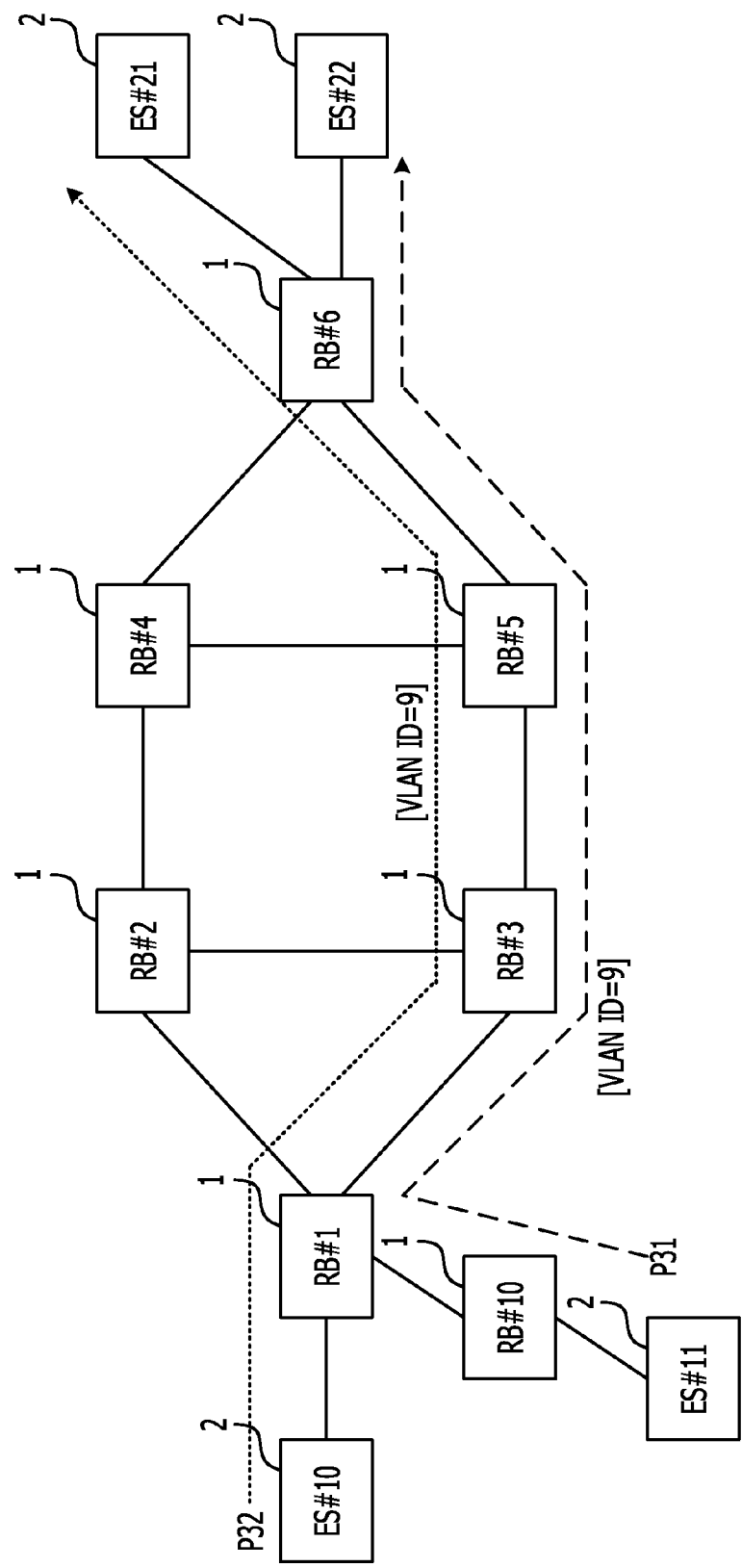
FIG. 27 is a network topology diagram illustrating an example of communication paths modified by command input.

FIG. 27 is a network topology diagram illustrating an example of communication paths modified by command input. In this example, the communication path P30 between the nodes ES#10 and ES#21 is modified to another communication path P32 by command input. The communication path P32 traverses the nodes RB#1, RB#3, RB#5, and RB#6 in that order.

FIG. 28 illustrates routing table settings for the node RB#1 in the state of FIG. 27. In the "Ingress RB" routing tale, for VLAN ID 9, RB#3 is set to the next node ID with a priority of "High". Consequently, the packet forwarding device 1 of the node RB#1 forwards a packet from the node ES#10 to the next node RB#3 on the communication path set by command input. Note that since the "Transit RB" routing table is not modified, there are no modifications to the communication path P31 between the nodes ES#11 and ES#22.

Figure 29:
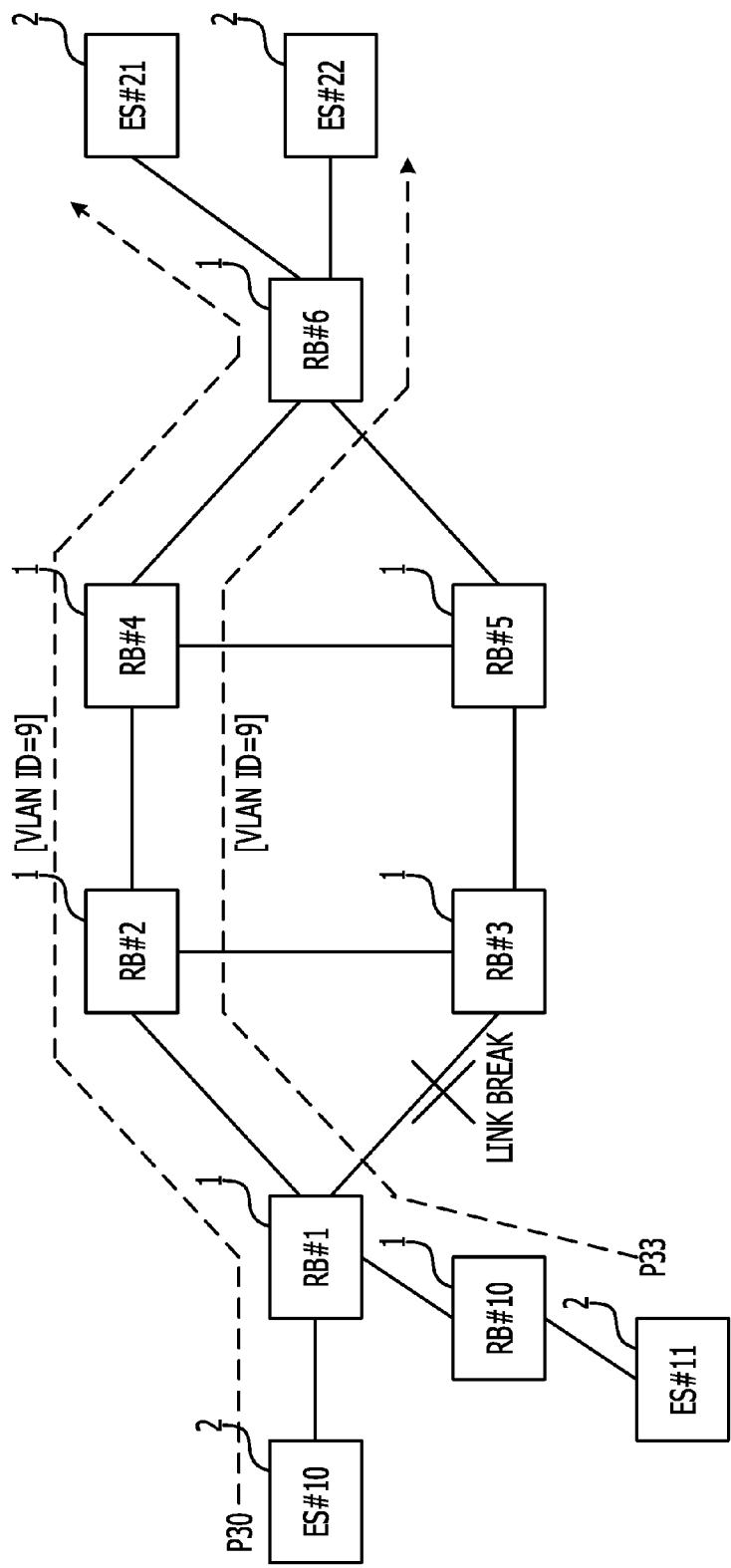
FIG. 29 is a network topology diagram illustrating an example of communication paths after link break.

FIG. 29 is a network topology diagram illustrating an example of communication paths after link break. In this example, a link break occurs between the nodes RB#1 and RB#3, and the communication path P32 between the nodes ES#10 and ES#21 is modified to the autonomously set communication path P30. Also, since communication becomes unavailable due to the link break, the communication path P31 between the nodes ES#11 and ES#22 is modified to another autonomously set communication path P33.

FIG. 30 illustrates routing table settings for the node RB#1 in the state of FIG. 29. In the "Ingress RB" routing table, the setting of the next node ID with a priority of "High" is deleted. Herein, assume that the path recovery setting is disabled. Accordingly, the communication path P32 between the nodes ES#10 and ES#21 is switched to the autonomously set communication path P30.

Also, in the "Ingress RB" routing table, the next node ID setting for the VLAN IDs 12 to 15 is modified from RB#3 to RB#2. Accordingly, the communication paths for other VLAN IDs are switched to other autonomously set paths so as to avoid the link failure. Similarly, in the "Transit RB" routing table, the next node ID setting for the VLAN IDs 9, 11, 13, and 15 is modified from RB#3 to RB#2.

In this way, even in the case in which different ECMPs coexist, the packet forwarding device 1 is able to effectively control communication paths.

As discussed up to this point, a packet forwarding device 1 according to the embodiment includes multiple ports 15, a switch unit 13, a CLI processing unit 12, a settings processing unit 100, and a failure detection unit 101. The multiple ports 15 are respectively connected to multiple nodes on the network, and transmit and receive packets.

The switch unit 13 switches packets among the multiple ports 15 in accordance with a routing table. The CLI processing unit 12 receives command input from an operator.

The settings processing unit 100 sets the routing table so that, from among the multiple nodes, packets are forwarded to the next node on a communication path set by command input. The failure detection unit 101 detects a link failure on the network.

When the failure detection unit 101 detects a link failure on the way to the next node on a communication path set by command input, the failure detection unit 101 modifies the routing table settings so that the packet forwarding destination switches to the next node on an autonomously set communication path. When the failure detection unit 101 detects a link failure at another location on the network, the settings processing unit 100 maintains the routing table settings.

With a packet forwarding device 1 according to the embodiment, the switch unit 13 exchanges packets among the multiple ports 15 in accordance with a routing table, and thus is able to forward packets among multiple nodes. The settings processing unit 100 sets the routing table so that, from among the multiple nodes, packets are forwarded to the next node on a communication path set by command input. For this reason, communication paths are arbitrarily set by the operator.

When the failure detection unit 101 detects a link failure on the way to the next node on a communication path set by command input, the failure detection unit 101 modifies the routing table settings so that the packet forwarding destination switches to the next node on an autonomously set communication path. For this reason, in the case in which communication via a communication path set by command input becomes unavailable due to the occurrence of a link failure, the communication path is switched so as to avoid the link failure, and communication continues.

When the failure detection unit 101 detects a link failure at another location on the network, the settings processing unit 100 maintains the routing table settings. For this reason, a communication path set by command input is maintained, improving convenience. Consequently, with a packet forwarding device 1 according to the embodiment, communication path control is improved.

In addition, in a packet forwarding method according to the embodiment, for at least one of multiple nodes on a network, a packet is forwarded to a next node on a communication path set by command input received from an operator. Upon detecting a link failure with a next node on the communication path set by the command input, the packet forwarding destination is switched to a next node on an autonomously set communication path. Upon detecting a link failure at another location on the network, the packet forwarding destination is maintained.

A packet forwarding method according to the embodiment has a similar configuration as the above packet forwarding device 1, and thus exhibits the above operational advantages.

Additionally, according to the embodiment discussed above, an operator may arbitrarily set a communication path while still conducting autonomous path control according to a protocol based on TRILL technology. Also, even in the case of recalculating communication paths due to the occurrence of a link failure, dynamic path control is supported while still maintaining communication paths set by the operator as much as possible, thereby enabling the provision of a flexible network.

Consequently, according to the embodiment discussed above, it becomes possible to use a protocol based on TRILL technology to realize a software-defined network (SDN), or in other words, a virtual network whose topology and settings are freely modifiable with just software. For example, using software, it becomes possible to conduct traffic engineering that allocates bandwidth as uniformly as possible to each communication path of an ECMP, or reroute traffic from a target device without problems during maintenance work.

The foregoing thus specifically describes the content of the present disclosure with reference to a preferred embodiment, but it is clear to persons skilled in the art that various modifications may be adopted based on the underlying technical ideas and teachings of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A data transmitting device coupled to a plurality of nodes in a network that includes a plurality of communication paths, the data transmitting device comprising:
a memory; and
a processor coupled to the memory and configured to
for each of the plurality of nodes, set a first entry in a routing table in the memory based on a plurality of link costs indicating communication rate of the plurality of the communication paths, respectively,
receive a command,
for at least a first node among the plurality of nodes, set a second entry in the routing table in the memory based on the command that designates a first communication path that has priority among the plurality of communication paths between the first node and a second node included in the plurality of nodes, when the second entry is set based on the command, select the first communication path based on the second entry, detect a link failure occurred in the network, determine where the link failure occurred, and when it is determined that the link failure occurred in the first communication path, select a second communication path from the plurality of communication paths between the first node and the second node based on the first entry and transmit data to the second node via the second communication path, and when it is determined that the link failure occurred out of the first communication path in the network, transmit the data to the second node via the first communication path based on the second entry.

2. The data transmitting device according to claim 1, wherein
the second node is positioned adjacent to the data transmitting device on the second communication path.

3. The data transmitting device according to claim 2, further comprising:
a plurality of ports that transmit the data and are respectively connected to the plurality of nodes in the network; and
a switch that selects a port for transmitting the data from the plurality of ports, wherein
the switch selects a first port from the plurality of ports based on the second entry in the routing table, and
the switch selects a second port from the plurality of ports based on the first entry in the routing table, upon detecting the link failure in the first communication path.

4. The data transmitting device according to claim 3, wherein
the processor is configured to detect recovery from the link failure in the first communication path, and the switch selects a first port from the plurality of ports based on the second entry in the routing table.

5. The data transmitting device according to claim 2, wherein
the data is included in a packet, and the packet is assigned a packet identifier for identifying the packet, and
the processor is configured to, when the communication rate of a third communication path included in the plurality of communication paths is the same as the communication rate of the second communication path, select one of the second communication path and the third communication path based on the packet identifier.

6. A data transmitting method from a data transmitting device included in a network including a plurality of nodes and a plurality of communication paths, the data transmitting method comprising:
for each of the plurality of nodes, setting a first entry in a routing table in a memory based on a plurality of link costs indicating communication rate of the plurality of the communication paths, respectively,
receiving a command,
for at least a first node among the plurality of nodes, setting a second entry in the routing table based on the command that designates a first communication path that has priority among the plurality of communication paths between the first node and a second node included in the plurality of nodes,
when the second routing entry is set based on the command, selecting the first communication path based on the second entry,
detecting a link failure occurred in the network,
determining where the link failure occurred, and
when it is determined that the link failure occurred in the first communication path, select a second communication path from the plurality of communication paths between the first node and the second node based on the first entry and transmit data to the second node via the second communication path, and when it is determined that the link failure occurred out of the first communication path in the network, transmit the data to the second node via the first communication path based on the second entry.

7. The data transmitting method according to claim 6, wherein the second node is positioned adjacent to the data transmitting device on the second communication path.

8. The data transmitting method according to claim 7, wherein
the data transmitting device includes a plurality of ports that transmit the data and are respectively connected to the plurality of nodes in the network and a switch that selects a port for transmitting the data from the plurality of ports,
the switch selects a first port from the plurality of ports based on the second entry in the routing table, and
the switch selects a second port from the plurality of ports based on the first entry in the routing table, upon detecting the link failure in the first communication path.

9. The data transmitting method according to claim 8, further comprising:
detecting recovery from the link failure in the first communication path, and selecting a first port from the plurality of ports based on the second entry in the routing table.

10. The data transmitting method according to claim 7, wherein
the data is included in a packet, and the packet is assigned a packet identifier for identifying the packet, and
when the communication rate of a third communication path included in the plurality of communication paths is the same as the communication rate of the second communication path, selecting one of the second communication path and the third communication path based on the packet identifier.

11. A non-transitory computer-readable storage medium storing a program that causes an information processing apparatus to execute a data transmitting method, the method is performed using a data transmitting device included in a network including a plurality of nodes and a plurality of communication paths, the method comprising:
for each of the plurality of nodes, setting a first entry in a routing table in a memory based on a plurality of link costs indicating communication rate of the plurality of the communication paths, respectively,
receiving a command,
for at least a first node among the plurality of nodes, setting a second entry in the routing table based on the command that designates a first communication path that has priority among the plurality of communication paths between the first node and a second node included in the plurality of nodes,
when the second entry is set based on the command, selecting the first communication path based on the second entry,
detecting a link failure occurred in the network,
determining where the link failure occurred, and
when it is determined that the link failure occurred in the first communication path, select a second communication path from the plurality of communication paths between the first node and the second node based on the first entry and transmit data to the second node via the second communication path, and when it is determined that the link failure occurred out of the first communication path in the network, transmit the data to the second node via the first communication path based on the second entry.

12. The non-transitory computer-readable storage medium according to claim 11, wherein the second node is positioned adjacent to the data transmitting device on the second communication path.

13. The non-transitory computer-readable storage medium according to claim 12, wherein
the data transmitting device includes a plurality of ports that transmit the data and are respectively connected to the plurality of nodes in the network and a switch that selects a port for transmitting the data from the plurality of ports,
the switch selects a first port from the plurality of ports based on the second entry in the routing table, and
the switch selects a second port from the plurality of ports based on the first entry in the routing table, upon detecting the link failure in the first communication path.

14. The non-transitory computer-readable storage medium according to claim 13, further comprising:
detecting recovery from the link failure in the first communication path, and selecting a first port from the plurality of ports based on the second routing table.

15. The non-transitory computer-readable storage medium according to claim 12, wherein
the data is included in a packet, and the packet is assigned a packet identifier for identifying the packet, and
when the communication rate of a third communication path included in the plurality of communication paths is the same as the communication rate of the second communication path, selecting one of the second communication path and the third communication path based on the packet identifier.

* * * * *